United States Patent
Nasu et al.

(10) Patent No.: US 8,214,564 B2
(45) Date of Patent: Jul. 3, 2012

(54) CONTENT TRANSFER SYSTEM, INFORMATION PROCESSING APPARATUS, TRANSFER METHOD, AND PROGRAM

(75) Inventors: Hidetaka Nasu, Tokyo (JP); Toshihiro Morita, Kanagawa (JP)

(73) Assignees: Sony Corporation, Tokyo (JP); Sony Mobile Communications Japan, Inc., Tokyo (JP)

( * ) Notice: Subject to any disclaimer, the term of this patent is extended or adjusted under 35 U.S.C. 154(b) by 1180 days.

(21) Appl. No.: 11/840,730

(22) Filed: Aug. 17, 2007

(65) Prior Publication Data

US 2008/0052264 A1    Feb. 28, 2008

(30) Foreign Application Priority Data

Aug. 24, 2006   (JP) ................................ 2006-227832

(51) Int. Cl.
   *G06F 13/12*   (2006.01)
   *G06F 21/00*   (2006.01)
(52) U.S. Cl. .......................................... 710/62; 705/51
(58) Field of Classification Search ................... 710/62; 705/51

See application file for complete search history.

(56) References Cited

U.S. PATENT DOCUMENTS

| | | | | |
|---|---|---|---|---|
| 2003/0084283 A1* | 5/2003 | Pixton | ............................ | 713/163 |
| 2004/0011190 A1 | 1/2004 | Kawashima | | |
| 2004/0095958 A1* | 5/2004 | Ejzak et al. | .................... | 370/465 |
| 2006/0059095 A1* | 3/2006 | Akins et al. | ....................... | 705/51 |
| 2008/0260177 A1* | 10/2008 | Yashiro et al. | ................... | 381/77 |

FOREIGN PATENT DOCUMENTS

| | | |
|---|---|---|
| EP | 1 463 332 A1 | 9/2004 |
| EP | 1 860 643 A1 | 11/2007 |
| JP | 2002-342218 | 11/2002 |
| WO | WO 2006/006417 A1 | 1/2006 |
| WO | WO 2007/053115 A1 | 5/2007 |

OTHER PUBLICATIONS

Definition of 'MP3', 1999, John Wiley & Sons Ltd.*

* cited by examiner

*Primary Examiner* — Hyun Nam
(74) *Attorney, Agent, or Firm* — Oblon, Spivak, McClelland, Maier & Neustadt, L.L.P.

(57) ABSTRACT

A content transfer system composed of a content reproduction terminal and an information processing apparatus is disclosed. A storage section stores information representing a file format and a bit rate of content reproducible by the reproduction terminal. A transmission section transmits the information stored in the storage section to the information processing apparatus. An obtainment section obtains the information representing the file format and the bit rate of the content reproducible by the reproduction terminal therefrom. A conversion section converts content having a predetermined file format and a predetermined bit rate as a transfer target into content having the file format and the bit rate represented by the information obtained by the obtainment section. A transfer section transfers the content converted by the conversion section to the reproduction terminal.

9 Claims, 16 Drawing Sheets

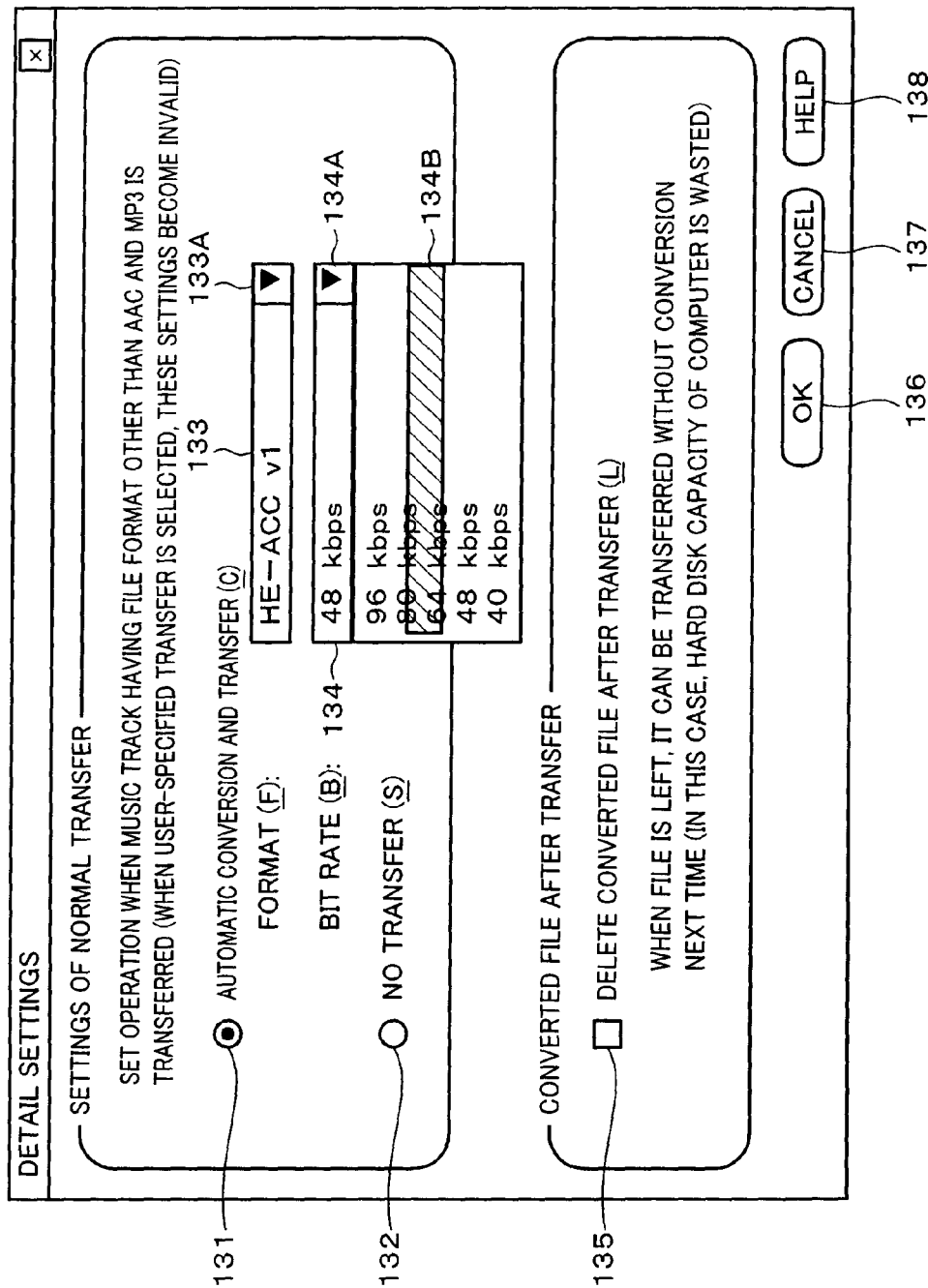

CONTENT TRANSFER SYSTEM, INFORMATION PROCESSING APPARATUS, TRANSFER METHOD, AND PROGRAM

CROSS REFERENCES TO RELATED APPLICATIONS

The present invention contains subject matter related to Japanese Patent Application JP 2006-227832 filed in the Japanese Patent Office on Aug. 24, 2006, the entire contents of which being incorporated herein by reference.

BACKGROUND OF THE INVENTION

1. Field of the Invention

The present invention relates to a content transfer system, an information processing apparatus, a transfer method, and a program, in particular, to those that allow content to be transferred in a file format and at a bit rate optimum to a reproduction terminal to which the content is transferred.

2. Description of the Related Art

In recent years, mobile phones having a hard disk or a flash memory have been widespread in a music listening style.

The user can listen to music with his or her mobile phone in such a manner that he or she rips a music track file from a music CD (Compact Disc) or downloads it from a predetermined site through the Internet to a personal computer and then transfers the music track file to the mobile phone.

FIG. 1 is a schematic diagram showing the concept of a content transfer of related art.

FIG. 1 shows a mobile phone 1 as an exemplary portable device (PD) that is a music track file transfer target. The mobile phone 1 is a PD having a music reproducing function. The mobile phone 1 is connected to the PC to which the user has ripped music track files through a USB (Universal Serial Bus) cable or the like. The user selects a music track to be transferred to the mobile phone 1 on a screen displayed by a music management application that operates on the PC.

In the example shown in FIG. 1, the file formats and bit rates of music track files have been set to the music management application for each category of PDs as transfer targets. The default file format and bit rate of music track files transferred to mobile phones are defined as HE-AAC (High-Efficiency Advanced Audio Coding) and 48 kbps, respectively. The file format HE-AAC and bit rate 48 kbps have been used as a file format and a bit rate of music track files that can be reproduced by many mobile phones.

Thus, as shown in FIG. 1, when a music track file to be transferred to the mobile phone has been ripped in the MP3 (MPEG Audio Layer-3) file format to the PC, as represented by a white arrow Al, the music track file is converted into a music track file having a file format of HE-AAC and a bit rate of 48 kbps by the music management application and then the converted music track file is transferred to the mobile phone 1 as represented by a white arrow $A_2$.

When the user selects a music track file to be transferred and commands the PC to start transferring the selected music track file to the mobile phone 1, the PC automatically converts the selected music track file into a music track file to be transferred on the basis of the settings of the music management application without necessity to set the file format and the bit rate.

When necessary, the user can change the settings of the format and bit rate of a file to be converted on the basis of the grade of the music reproduction function of the mobile phone, user's desired music quality, and so forth. In the example shown in FIG. 1, the user has changed the file format and bit rate of a music track file to be transferred to AAC-LC (Advanced Audio Coding-Low Complexity) and 128 kbps, respectively. When the user has changed the settings of the file format and bit rate of a music track file to be converted, the settings of the file format and bit rate that he or she has changed are prioritized against the default settings and are used when a music track file is converted.

Thus, in the music management application that operates on the PC, the file format and bit rate of a music track file are set on the basis of the category of a PD as a transfer target. For example, when a mobile phone is a transfer target, "the file format and bit rate are set to HE-AAC and 48 kbps, respectively" and when a music reproduction-only PD is a transfer target, "the file format and bit rate are set to ATRAC (Adaptive Transform Acoustic Coding (OpenMG) and 64 kbps, respectively".

In this case, when the user has a plurality of mobile phones of different models (they can be identified by their model names that contain a predetermined number of digits, for example, "703" and "903" and that are common in mobile phones released by several manufacturers in a particular season) and their file formats and bit rates are different, it is difficult to set the file format and bit rate of a music track file to be converted on the basis of each model of the mobile phones. To solve this problem, a technology of which the file format and bit rate of a conversion target can be set on the basis of each model of PDs as one category has been proposed.

FIG. 2 is a schematic diagram showing the concept of a content transfer of another related art.

In the example shown in FIG. 2, the file format and bit rate of a music track file are set to the music management application on the basis of the model of a mobile phone as a transfer target. The default settings of the file format and bit rate of a music track file to be transferred to a model A mobile phone are HE-AAC and 48 kbps, respectively. The default settings of the file format and bit rate of a music track file to be transferred to a model B mobile phone are AAC-LC and 128 kbps, respectively.

As shown in FIG. 2, when a model A mobile phone 1 is connected to the PC, the model name is obtained from the mobile phone 1 by the music management application. When the user commands the PC to transfer a PM3 music program to the mobile phone 1, the MP3 music track file is automatically converted into a music track file having a file format of HE-AAC and a bit rate of 48 kbps as represented by a white arrow All based on the model name obtained from the mobile phone 1 by the music management application. After the file format and bit rate of the music track file have been converted, the converted music track file is transferred from the PC to the mobile phone 1 as represented by a white arrow $A_{12}$.

Thus, when the user just connects the mobile phone 1 to the PC, a music track file having a file format and a bit rate based on the model of the mobile phone 1 can be automatically transferred thereto. As a result, the user can listen to music with the mobile phone 1.

Japanese Patent Application Laid-Open No. 2002-123265 (referred to as patent document 1) discloses a music track file transfer system as shown in FIG. 2.

SUMMARY OF THE INVENTION

As described above, even if the file format and bit rate are set and managed on the basis of each model of a mobile phone, since the music management application of related art does not have information representing models of mobile phones released after the application, a music track file may not be able to be transferred to a new model mobile phone such that the music track file has a file format and a bit rate optimum thereto.

Even if the models of mobile phones are the same, the file formats and bit rates of music track files that can be reproduced by the mobile phones may vary depending on their manufacturers. In this case, as described with reference to FIG. 2, it is difficult to solve this situation by setting a file format and a bit rate of a music track file optimum to each model.

In view of the foregoing, it would be desirable to provide a content transfer system, an information processing apparatus, a transfer method, and a program that allow content to be transferred to a reproduction apparatus such that the file format and the bit rate of the content are optimum to a reproduction apparatus as a transfer target.

According to an embodiment of the present invention, there is provided a content transfer system composed of a reproduction terminal which reproduces content and an information processing apparatus. The reproduction terminal includes a storage section and a transmission section. The storage section stores information representing a file format and a bit rate of content reproducible by the reproduction terminal. The transmission section transmits the information stored in the storage section to the information processing apparatus. The information processing apparatus includes an obtainment section, a conversion section, and a transfer section. The obtainment section obtains the information representing the file format and the bit rate of the content reproducible by the reproduction terminal therefrom. The conversion section converts content having a predetermined file format and a predetermined bit rate as a transfer target into content having the file format and the bit rate represented by the information obtained by the obtainment section. The transfer section transfers the content converted by the conversion section to the reproduction terminal.

According to an embodiment of the present invention, there is provided an information processing apparatus which transfers content to a reproduction terminal. The information processing apparatus includes, an obtainment section, a conversion section, and a transfer section. The obtainment section obtains information representing a file format and a bit rate of the content reproducible by the reproduction terminal therefrom. The conversion section converts content having a predetermined file format and a predetermined bit rate as a transfer target into content having the file format and the bit rate represented by the information obtained by the obtainment section. The transfer section transfers the content converted by the conversion section to the reproduction terminal.

The information processing apparatus may also include a storage section which stores information representing a file format and a bit rate of content as a conversion target, the information being set by a user. In this case, the conversion section converts the content as the transfer target such that the file format and the bit rate represented by the information obtained by the obtainment section are changed to the file format and the bit rate represented by the information stored in the storage section.

The obtainment section may also obtain a list of file formats of content reproducible by the reproduction terminal therefrom. When the file format of the content as the transfer target has not been registered in the list obtained by the obtainment section, the conversion section may convert the content as the transfer target such that the content as the transfer target has the file format and the bit rate represented by the information obtained by the obtainment section.

The information representing the file format and the bit rate of the content reproducible by the reproduction terminal may have been stored in the reproduction terminal upon sales thereof.

According to an embodiment of the present invention, there is provided a transfer method or a program of transferring content to a reproduction terminal. Information representing a file format and a bit rate of the content reproducible by the reproduction terminal is obtained therefrom. Content having a predetermined file format and a predetermined bit rate as a transfer target is converted into content having the file format and the bit rate represented by the obtained information. The converted content is transferred to the reproduction terminal.

In the content transfer system according to an embodiment of the present invention, the reproduction terminal stores information representing the file format and bit rate of content reproducible by the reproduction terminal. The information is transmitted to the information processing apparatus. The information processing apparatus obtains the information representing the file format and the bit rate of the content reproducible by the reproduction terminal and converts the content to be transferred such that the predetermined file format and bit rate of the content are changed to those represented by the obtained information. The converted content is transferred to the reproduction terminal.

In the information processing apparatus according to an embodiment of the present invention, information representing the file format and bit rate of content reproducible by the reproduction terminal is obtained therefrom. The content having the predetermined file format and the predetermined bit rate is converted into content having the file format and the bit rate represented by the obtained information. The converted content is transferred to the reproduction terminal.

According to the foregoing embodiments of the present invention, content having the file format and the bit rate optimum to the reproduction terminal as a transfer target can be transferred thereto.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 16 is a schematic diagram showing another exemplary setting screen.

DETAILED DESCRIPTION OF THE PREFERRED EMBODIMENTS

Next, embodiments of the present invention will be described. The relationship between the invention described in this specification and embodiments of the present invention is as follows. The description in this section denotes that embodiments that support the invention set forth in the specification are described in this specification. Thus, even if some embodiments are not described in this section, it is not implied that the embodiments do not correspond to the invention. Conversely, even if embodiments are described as the invention in this section, it is not implied that these embodiments do not correspond to other than the invention.

Figure 1:
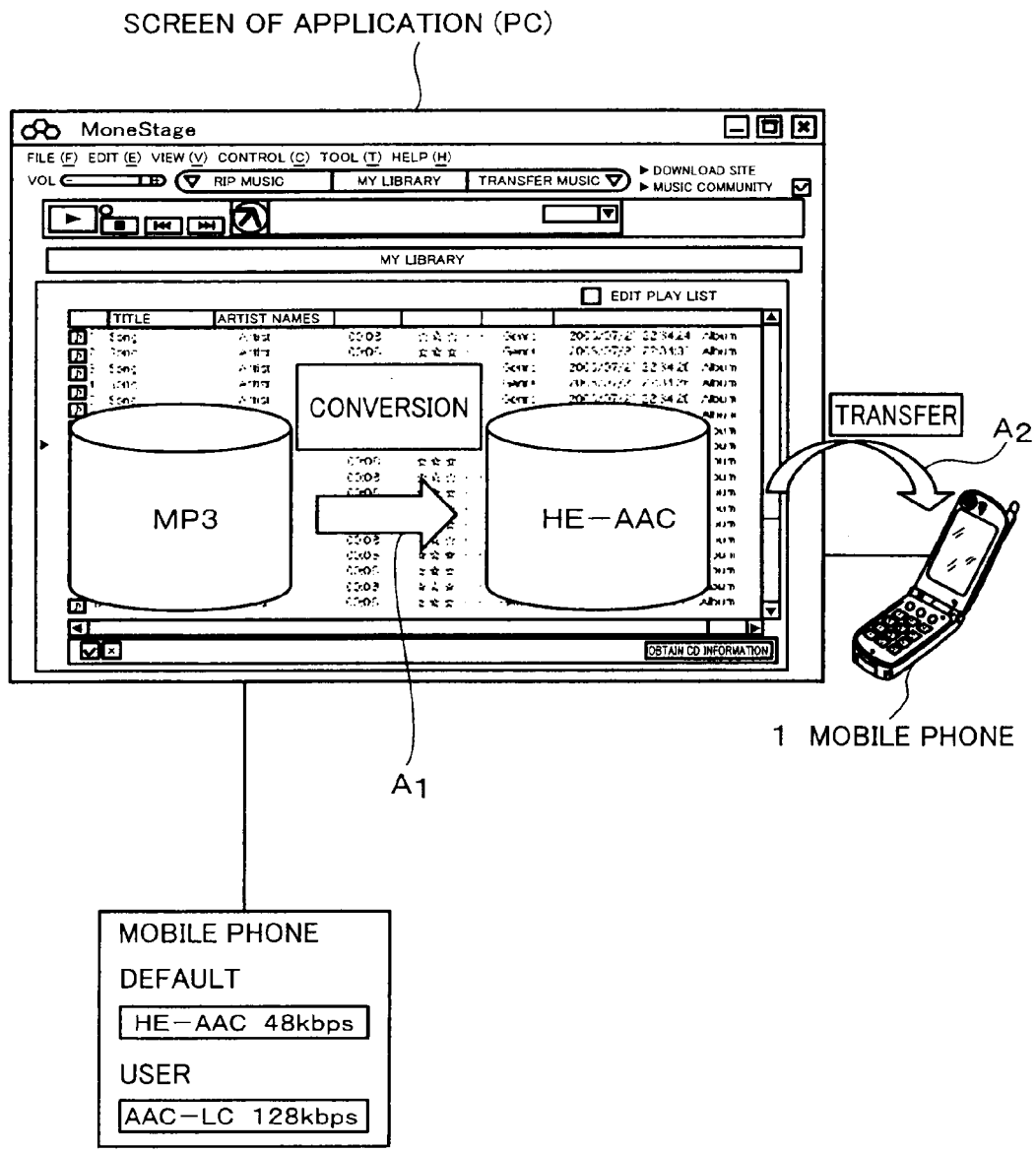
FIG. 1 is a schematic diagram showing the concept of a content transfer of related art.
Figure 2:
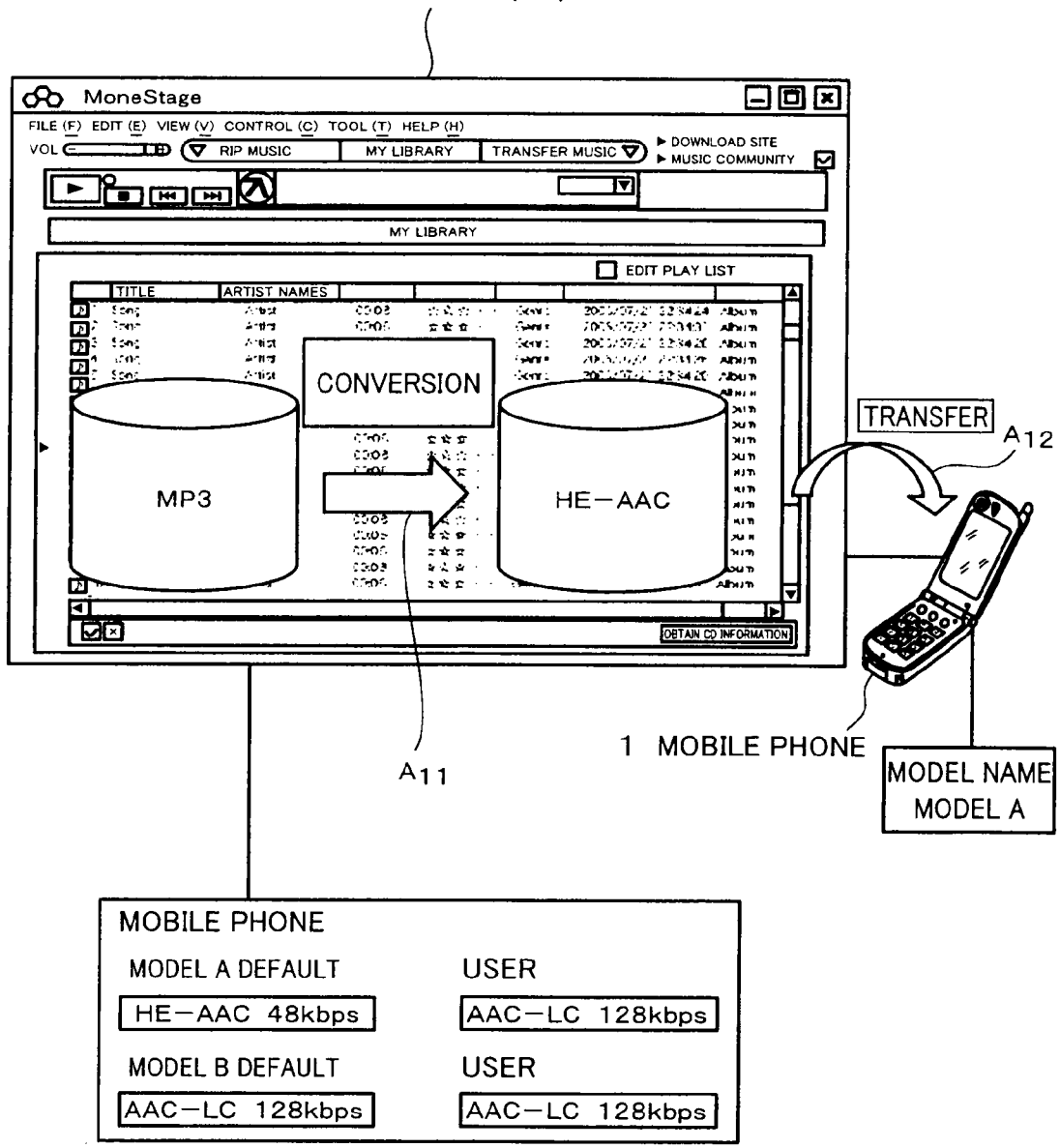
FIG. 2 is a schematic diagram showing the concept of a content transfer of another related art.
Figure 3:
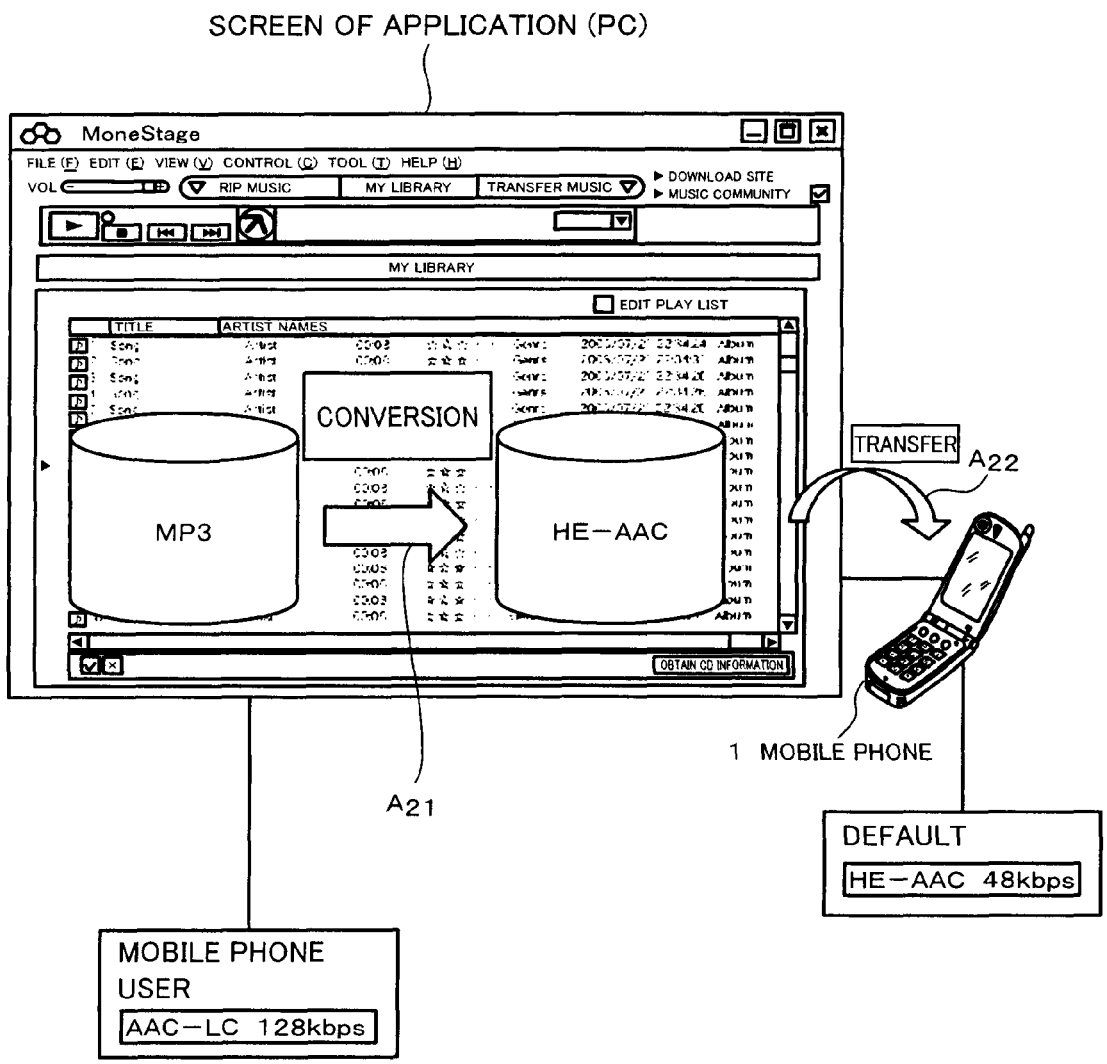
FIG. 3 is a schematic diagram showing the concept of a content transfer performed by a PC according to an embodiment of the present invention.
Figure 4:
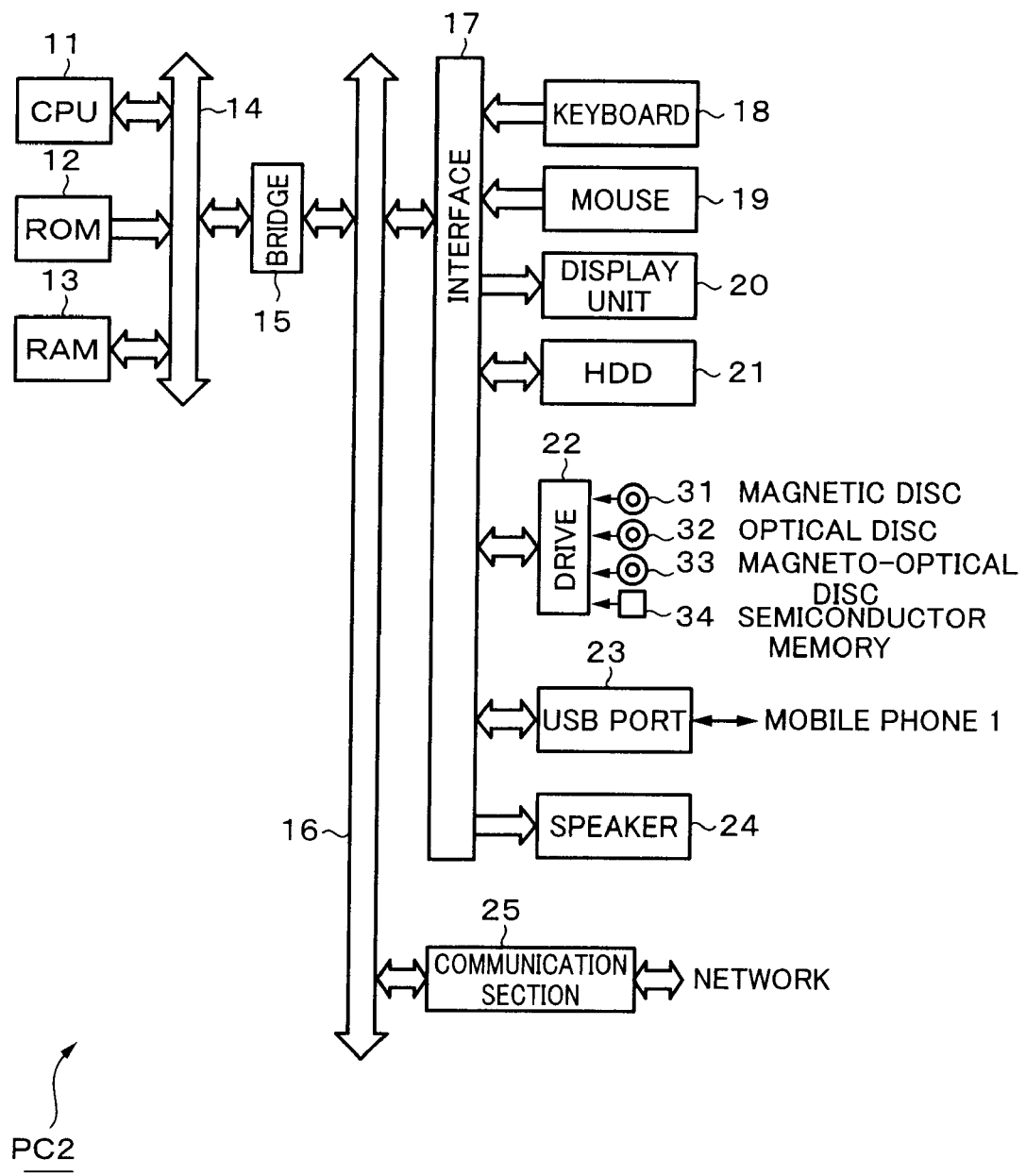
FIG. 4 is a block diagram showing an exemplary structure of hardware of the PC.

According to an embodiment of the present invention, there is provided a content transfer system composed of a reproduction terminal (for example, a mobile phone 1 shown in FIG. 3) which reproduces content and an information processing apparatus (for example, a PC 2 shown in FIG. 4). The reproduction terminal includes a storage section (for example, a conversion target default setting storage section 62 shown in FIG. 5) and a transmission section (for example, a mobile phone interface 61 shown in FIG. 5). The storage section stores information representing a file format and a bit rate of content reproducible by the reproduction terminal. The transmission section transmits the information stored in the storage section to the information processing apparatus. The information processing apparatus includes an obtainment section (for example, an application control section 42 shown in FIG. 5), a conversion section (for example, a conversion processing section 47 shown in FIG. 5), and a transfer section (for example, a transfer processing section 50 shown in FIG. 5). The obtainment section obtains the information representing the file format and the bit rate of the content reproducible by the reproduction terminal therefrom. The conversion section converts content having a predetermined file format and a predetermined bit rate as a transfer target into content having the file format and the bit rate represented by the information obtained by the obtainment section. The transfer section transfers the content converted by the conversion section to the reproduction terminal.

According to an embodiment of the present invention, there is provided an information processing apparatus which transfers content to a reproduction terminal. The information processing apparatus includes an obtainment section (for example, an application control section 42 shown in FIG. 5), a conversion section (for example, a conversion processing section 47 shown in FIG. 5), and a transfer section (for example, a transfer processing section 50 shown in FIG. 5). The obtainment section obtains information representing a file format and a bit rate of the content reproducible by the reproduction terminal therefrom. The conversion section converts content having a predetermined file format and a predetermined bit rate as a transfer target into content having the file format and the bit rate represented by the information obtained by the obtainment section. The transfer section transfers the content converted by the conversion section to the reproduction terminal.

Figure 5:
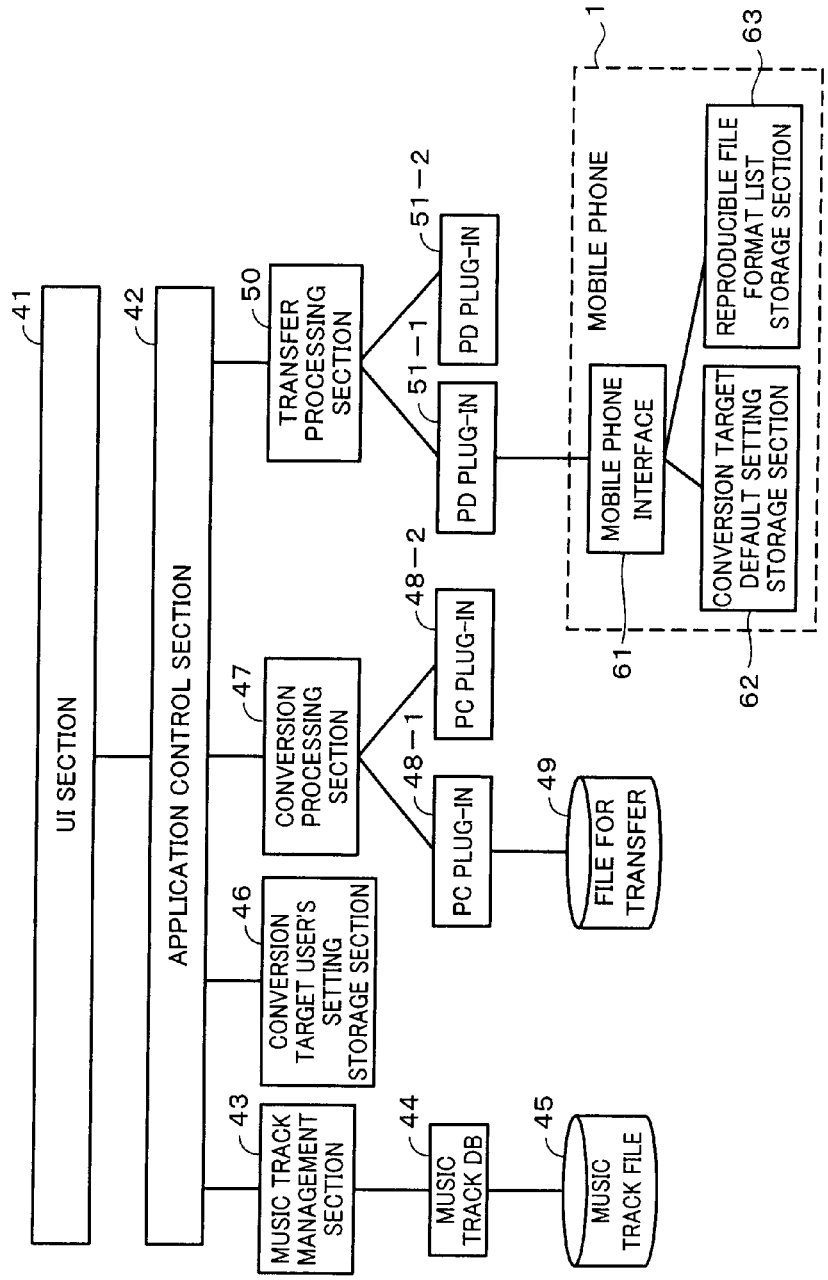
FIG. 5 is a block diagram showing an exemplary functional structure of the PC.

The information processing apparatus may also include a storage section (for example, a conversion target user's setting storage section 46 shown in FIG. 5) which stores information representing a file format and a bit rate of content as a conversion target, the information being set by a user.

According to an embodiment of the present invention, there is provided a transfer method or a program of transferring content to a reproduction terminal. Information representing a file format and a bit rate of the content reproducible by the reproduction terminal is obtained therefrom. Content having a predetermined file format and a predetermined bit rate as a transfer target is converted into content having the file format and the bit rate represented by the obtained information. The converted content is transferred to the reproduction terminal (for example, step S205 shown in FIG. 11).

Next, with reference to the accompanying drawings, embodiments of the present invention will be described.

FIG. 3 is a schematic diagram showing the concept of a content transfer performed by a PC according to an embodiment of the present invention.

FIG. 3 shows the mobile phone 1 as an exemplary transfer target PD. The mobile phone 1 is a PD having a music reproduction function. The mobile phone 1 is connected to the PC to which the user has ripped music track files through a USB cable or the like. The mobile phone 1 and the PC compose a content transfer system. The user selects a music track to be transferred on a screen displayed by a music management application that operates on the PC.

In the example shown in FIG. 3, the default settings of the conversion target that represent the default settings of the file format and bit rate of a music track file of a conversion target are managed by the mobile phone 1 rather than the music management application that operates on the PC. The default settings of the conversion target have been stored in the mobile phone 1 upon sales rather than are stored by a user's setting operation.

The mobile phone 1 also manages a reproducible file format list that is a list of file formats of music track files that the mobile phone 1 can reproduce. When there are a plurality of reproducible file formats, one of them is set as a default conversion target file format. When there are a plurality of reproducible bit rates, one of them is set as a default conversion target bit rate. In the example shown in FIG. 3, HE-ACC and 48 kbps are set as a default file format and a default bit rate, respectively.

Although the overall flow of processes of the system will be described later, when the user commands the PC to transfer a predetermined music track file to the mobile phone 1, the music management application determines whether or not the PC has stored as a music track file commanded to be transferred a music track file having the same file format as that registered in the reproducible file format list obtained from the mobile phone 1.

When the determined result denotes that the PC has stored a music track file having the same file format as that registered in the reproducible file format list obtained from the mobile phone 1, the PC transfers the music track file to the mobile phone 1.

In contrast, when the determined result denotes that the PC has not stored a music track file in the same format as that registered in the reproducible file format list, the PC converts the music track file commanded to be transferred into a music track file having the file format and bit rate represented by the default settings of the conversion target obtained from the mobile phone 1 as represented by a white arrow $A_{21}$ and transfers the converted music track file to the mobile phone 1 as represented by a white arrow $A_{22}$.

In such a manner, information representing default settings of the file format and bit rate of a music track file of a conversion target is managed by the PD. When a music track file is transferred, its settings are obtained by the music management application. When necessary, after the file format and bit rate of the music track file are converted, the music track file is transferred. Thus, the user can easily transfer a music track file having a file format and a bit rate optimum to the transfer target PD thereto.

When a new model PD released after the music management application has stored information representing default settings of the file format and bit rate of a music track file of a transfer target, the user can transfer a music track file having a file format and a bit rate optimum to the PD thereto.

When there are a plurality of file formats and bit rates of music track files that the mobile phone 1 can reproduce and the user has changed the default file format and bit rate, the user's settings are prioritized against the default settings of the conversion target and are used as the file format and bit rate of the conversion target. In the example shown in FIG. 3, the user has changed the settings of the file format and bit rate of a music track file to AAC-LC and 128 kbps, respectively. A flow of a sequence of steps of a music track file transfer will be described later.

FIG. 4 is a block diagram showing an exemplary hardware structure of a PC 2 that executes the music management application as shown in FIG. 3 and transfers a music track file to the mobile phone 1.

A CPU (Central Processing Unit) 11 executes the music management application (application program) and an OS (Operating System). A ROM (Read Only Memory) 12 stores a program and constant data (non-variable data) of calculation parameters that the CPU 11 uses. A RAM (Random Access Memory) 13 stores a program that the CPU 11 uses and parameters (variable data) that varies when the CPU 11 executes the parameter. These sections are mutually connected by a host bus 14 composed of a CPU bus or the like.

The host bus 14 is connected to an external bus 16 such as a PCI (Peripheral Component Interconnect/Interface) bus through a bridge 15. Connected to the external bus 16 are an interface 17 to which various types of devices are connected and a communication section 25.

A keyboard 18 connected to the interface 17 is operated when the user inputs various types of commands. A mouse 19 is operated by the user to move a pointer displayed on a display unit 20 and perform various types of selection operations. The display unit 20 is composed of an LCD (Liquid Crystal Display) or the like and displays various types of information such as a list of music tracks ripped to the PC 2. A HDD (Hard Disk Drive) 21 records various types of information such as the music management application that the CPU 11 executes. In addition, the HDD 21 records music track files ripped from a music CD and so forth as files having a predetermined file format and a predetermined bit rate.

A drive 22 reads data and a program from a magnetic disc 31, an optical disc 32, a magneto-optical disc 33, or a semiconductor memory 34 attached thereto and supplies the data and program to the RAM 13 and so forth through the interface 17, the external bus 16, the bridge 15, and the host bus 14.

Connected to a USB port 23 is one of various types of PDs such as the mobile phone 1 through a USB cable. Communication with the PD is made through the USB port 23.

A speaker 24 outputs a predetermined sound corresponding to a music track file based on an audio signal supplied from the interface 17.

The communication section 25 communicates with an external device through a network. For example, the communication section 25 receives a music track file from a site (web server) that performs a music track file download service and supplies the downloaded music track file to the HDD 21 through the external bus 16 and the interface 17. The downloaded music track file is recorded to the HDD 21.

FIG. 5 is a block diagram showing an exemplary functional structure of the PC 2.

At least part of functional sections shown in FIG. 5 is accomplished by the music management application executed by the CPU 11 shown in FIG. 4. FIG. 5 also shows part of functional sections accomplished by the mobile phone 1 connected as a music track file transfer target PD to the PC 2.

As shown in FIG. 5, the PC 2 accomplishes a UI (User Interface) section 41, an application control section 42, a music track management section 43, a conversion target user's setting storage section 46, a conversion processing section 47, and a transfer processing section 50. In contrast, the mobile phone 1 accomplishes a mobile phone interface 61, a conversion target default setting storage section 62, and a reproducible file format list storage section 63.

The UI section 41 of the PC 2 controls data displayed on a screen of the display unit 20. The UI section 41 displays for example a list of music track files ripped from a music CD or the like to the PC 2 and a list of music track files having been transferred to the mobile phone 1. Data necessary to display a screen are supplied from the application control section 42.

In addition, the UI section 41 accepts a user's operation through the mouse 19 and so forth and outputs information representing the content of the accepted operation to the application control section 42. The application control section 42 for example reproduces a selected music track file and transfers a music track file to the mobile phone 1 based on an operation accepted by the UI section 41.

The application control section 42 controls the overall operations to accomplish the function of the music management application. For example, the application control section 42 requests the music track management section 43 to obtain information representing a list of music track files that have been ripped and outputs the obtained information to the UI section 41 to display the list of music track files.

In addition, when the file format and bit rate of a music track file are converted, the application control section 42 obtains a source music track file from the music track management section 43 and outputs the obtained music track file to the conversion processing section 47 so as to convert the music track file. In addition, the application control section 42 supplies the music track file converted by the conversion processing section 47 to the transfer processing section 50 so as to transfer the music track file to the mobile phone 1.

The music track management section 43 manages music track files ripped from a music CD or the like and music track files downloaded from a predetermined server with a music track DB 44. A music track file 45 recorded to the HDD 21 is correlated with information representing a music track file recorded to the music track DB 44.

When the user has changed the default settings of the file format and bit rate of the conversion target, the conversion target user's setting storage section 46 stores the user's settings of the conversion target that represent the changed settings. When the user's settings of the conversion target have been stored in the conversion target user's setting storage section 46, the application control section 42 uses the file format and bit rate of the user's settings of the conversion target as the file format and bit rate of the conversion target instead of the default settings of the conversion target obtained from the mobile phone 1.

Thus, the default settings of the conversion target are managed on the PD side, whereas the user's settings of the conversion target are managed on the music management application side of the PC 2. Instead, the user's settings of the conversion target may be transferred to the PD such that it manages them.

The conversion processing section 47 converts the file format and bit rate of a music track file with a PC plug-in under the control of the application control section 42. A PC plug-in is provided on the basis of each file format of a conversion source music track file.

In the example shown in FIG. 5, two PC plug-ins 48-1 and 48-2 are provided. The PC plug-in 48-1 is a plug-in used for example when an MP3 music track file is converted into a music track file having another file format. In contrast, the PC plug-in 48-2 is a plug-in used for example when an ATRAC music track file is converted into a music track file having another file format.

When an MP3 music track file managed by the music track management section 43 is converted into a music track file having a file format of HE-AAC and a bit rate of 48 kbps, the conversion processing section 47 outputs the conversion source music track file supplied from the application control section 42 to the PC plug-in 48-1 so as to convert the file format and the bit rate of the music track file. A file for transfer 49 as a music track file converted by the PC plug-in 48-1 is supplied to the transfer processing section 50 by the application control section 42 and then transferred to the mobile phone 1.

The transfer processing section 50 transfers a music track file to the PD with a PD plug-in under the control of the application control section 42. A PD plug-in is provided on the basis of each transfer target PD.

In the example shown in FIG. 5, two PD plug-ins 51-1 and 51-2 are provided. The PD plug-in 51-1 is used for example when a music track file is transferred to the mobile phone 1. The PD plug-in 51-2 is used for example when a music program is transferred to a music reproduction-only PD.

In addition, the transfer processing section 50 obtains the default settings of the conversion target from a PD such as the mobile phone 1 under the control of the application control section 42 and outputs the obtained the default settings of the conversion target to the application control section 42. The transfer processing section 50 also obtains the reproducible file format list from a PD.

The mobile phone interface 61 of the mobile phone 1 communicates with the PD plug-in 51-1 of the PC 2 and transmits the default settings of the conversion target and the reproducible file format list to the transfer processing section 50 when requested by the transfer processing section 50 through the PD plug-in 51-1.

The conversion target default setting storage section 62 stores the default settings of the conversion target. When necessary, the default setting of the conversion target stored in the conversion target default setting storage section 62 are read by the mobile phone interface 61 and transmitted to the transfer processing section 50 of the PC 2.

The reproducible file format list storage section 63 stores the reproducible file format list. When necessary, the reproducible file format list stored in the reproducible file format list storage section 63 is read by the mobile phone interface 61 and transmitted to the transfer processing section 50 of the PC 2.

Figure 6:
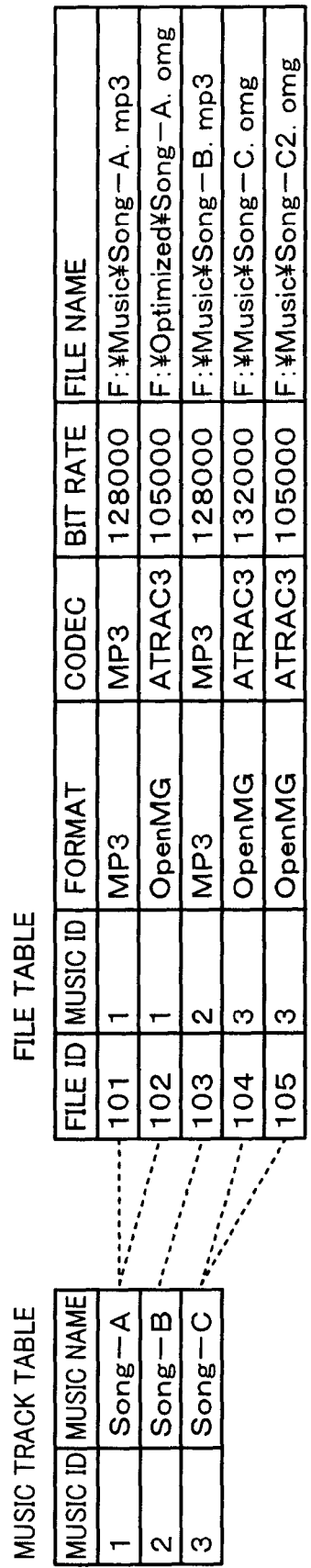
FIG. 6 is a schematic diagram showing exemplary information recorded to a music track DB.

FIG. 6 is a schematic diagram showing exemplary information recorded in the music track DB 44 shown in FIG. 5.

As shown in FIG. 6, the music track DB 44 is for example a relational database that manages music track files with a music track table and a file table.

The music track table is composed of two attributes "music track ID" and "music name" and represents a list of music track files that the PC 2 manages. In the example shown in FIG. 6, a music name identified by music track ID 1 is Song-A. A music name identified by music track ID 2 is Song-B. A music name identified by music track ID 3 is Song-C.

One music track has at least one music track file (rendition). Whenever a music track file is created, its attributes are recorded to the file table. In the example shown in FIG. 6, the file table is composed of attributes "file ID", "music track ID", "format", "codec", "bit rate", and "file name".

The file ID is identification information of a music track file. The format represents a file format. The codec represents an encoding system of a music track file. The bit rate represents a data amount per unit time (for example, one second) of a music track file. The file name represents the name of a music track file including a path composed of a drive name and a folder name.

In the example shown in FIG. 6, a music track identified by music track ID 1 is correlated with a music track file identified by file ID 101 and a music track file identified by file ID 102 as represented by dotted lines. The music track file identified by file ID 101 and the music track file identified by file ID 102 are two files that are composed of data of one music track identified by music track ID 1 and that differ in attributes such as a file format.

The format, codec, bit rate, and file name of the music track file identified by file ID 101 are "MP3", "MP3", "128000 bps", and "F:¥Music¥Song-A.mp3", respectively. The format, codec, bit rate, and file name of the music track file identified by file ID 102 are "OpenMG", "ATRAC3", "105000 bps", and "F:¥Optimized¥Song-A.omg", respectively.

Likewise, a music track identified by music track ID 2 is correlated with a music track file identified by file ID 103. A music track file identified music track ID 3 is correlated with a music track file identified by file ID 104 and a music track file identified by file ID 105.

When a music track to be transferred is selected and commanded to start transferring the selected music track, by referencing these attributes, it is determined whether or not a file having the same file format and bit rate as the default settings of the conversion target of the mobile phone 1 has been stored in the PC 2.

Next, with reference to a sequence chart shown in FIG. 7, a flow of a sequence of steps of the music track file transfer process will be described.

Figure 7:
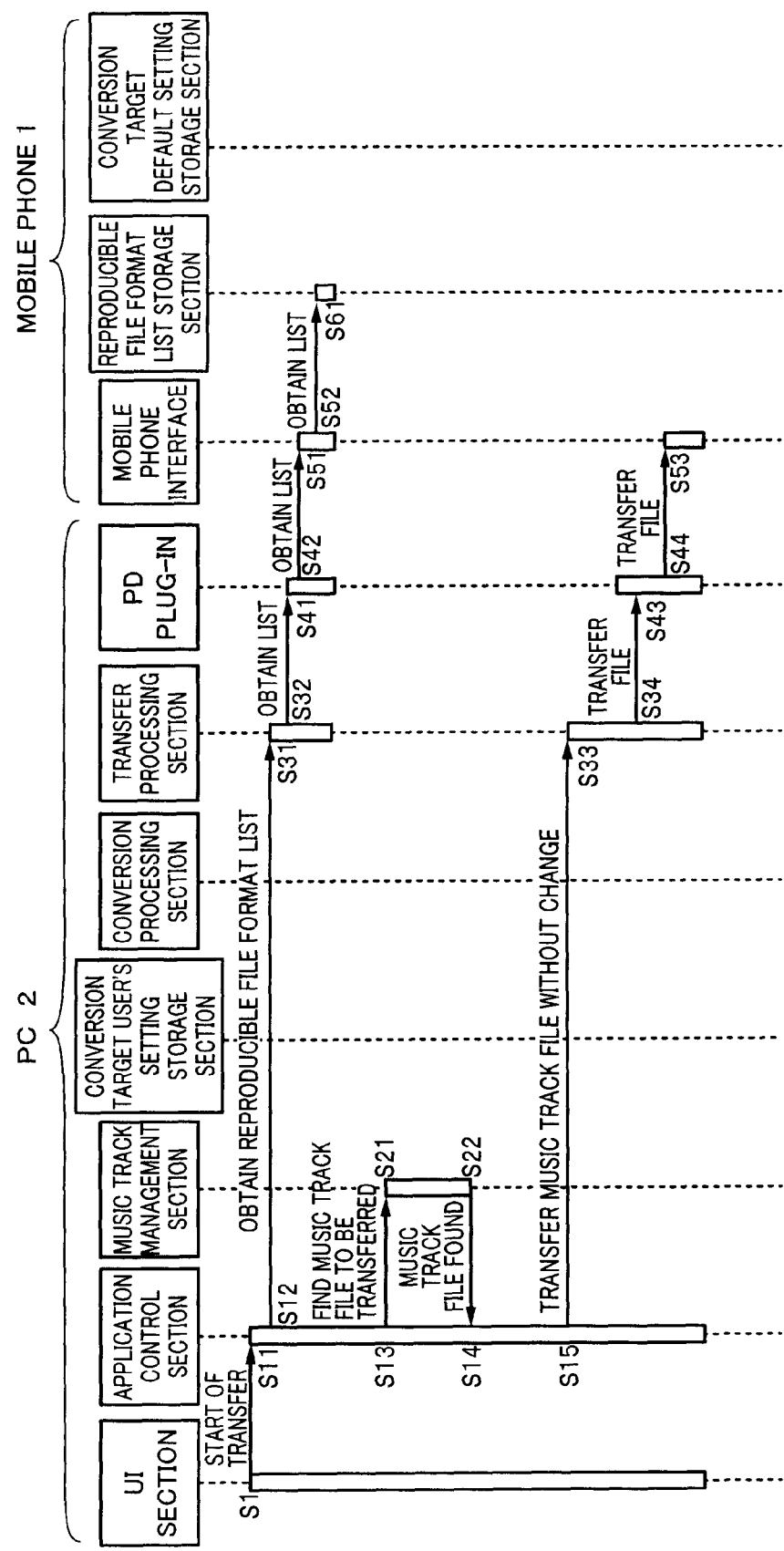
FIG. 7 is a sequence chart describing a flow of a sequence of steps of a music track file transfer process.

FIG. 7 shows the case that since a music track file having the same file format as that registered in the reproducible file format list obtained from the mobile phone 1 has been stored in the PC 2, the music track file commanded to be transferred is directly transferred to the mobile phone 1.

At step S1, the UI section 41 of the PC 2 commands the application control section 42 to start transferring the music track file. For example, when a predetermined music track is selected from a list of ripped music tracks that are displayed and the selected music track is commanded to be transferred, the UI section 41 commands the application control section 42 to start transferring the music track. The application control section 42 is also informed of a music track ID of the music track to be transferred. Each functional section is commanded and informed by transmitting and receiving a command having a predetermined format.

Figure 8:
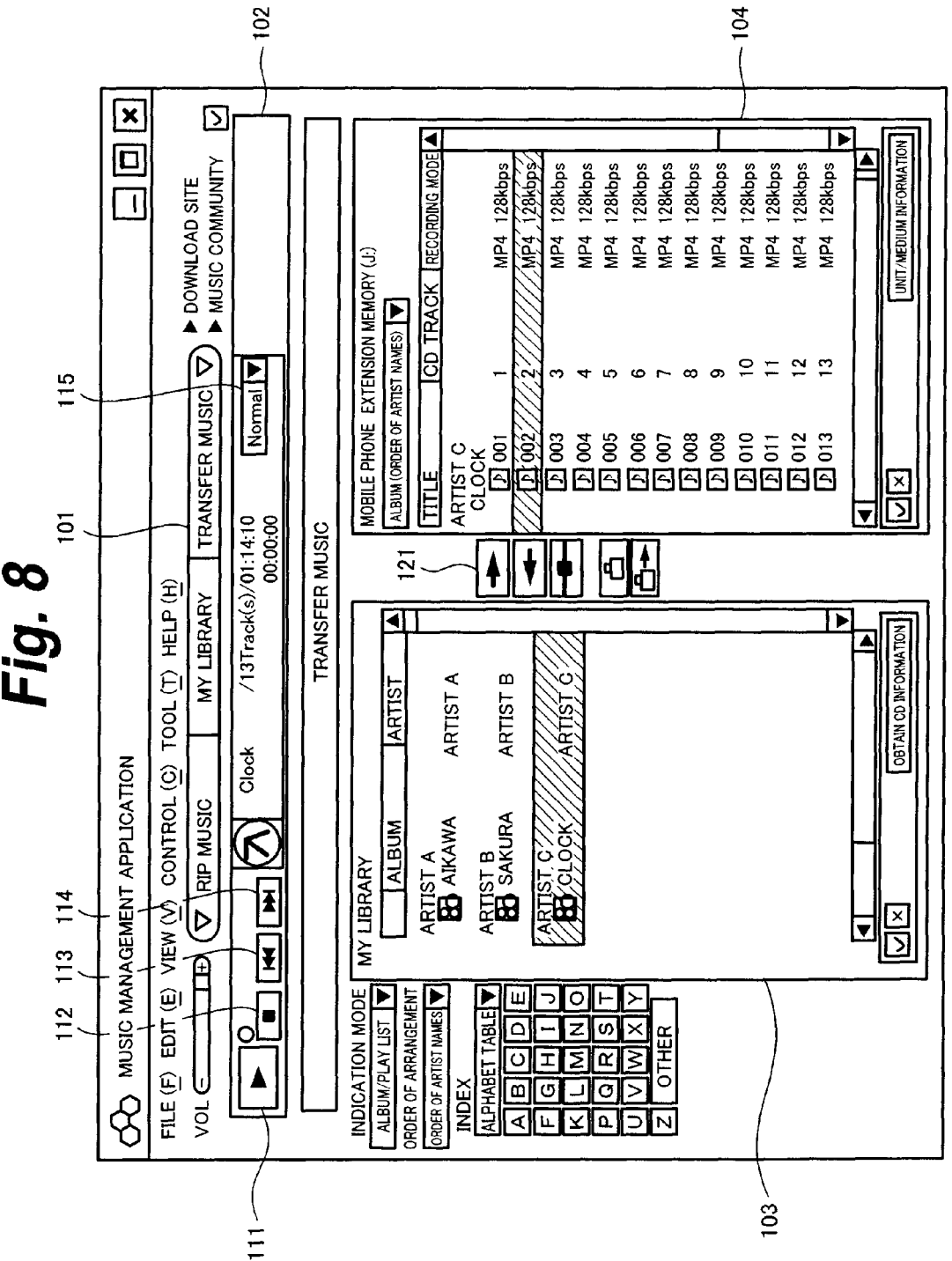
FIG. 8 is a schematic diagram showing an exemplary screen displayed on a display unit.

FIG. 8 is a schematic diagram showing an exemplary music track list screen displayed on the display unit 20.

The screen shown in FIG. 8 is displayed when "transfer music" is selected from three menu items "rip music", "my library", and "transfer music" indicated on a menu 101. "Rip music" is a menu item selected when a music track file is ripped from a music CD or the like loaded into the PC 2. "My library" is a menu item selected for example when a music track is reproduced. "Transfer music" is a menu item selected when a music track file is transferred to a PD such as the mobile phone 1.

When the menu item "transfer music" is selected, a my library column 103 that indicates a list of ripped music tracks (album) is displayed on the left of the my-library field 103 and below the operation panel 102 and a transfer music track column 104 that indicates a list of music tracks registered to be transferred to the mobile phone 1 and a list of music tracks having been transferred is displayed on the right of the my-library field 103 and below the operation panel 102.

Displayed on the operation panel 102 shown in FIG. 8 are a reproduction button 111 operated when a music track selected from music tracks in the my library column 103 is commanded to be reproduced, a stop button 112 operated when the reproduction of a music track is stopped, a retreat button 113 used when the current music track is changed to the previous music track, and a forward button 114 operated when the current music track is advanced to the next music track. Disposed on the right of the forward button 114 is an indication section 115 that indicates information representing a music track selected from the music tracks displayed in the my library column 103.

The my library column 103 indicates pictures of jackets and titles of albums of artists A to C. The transfer music track column 104 indicates information of the titles, recording modes, and so forth of music tracks registered as those to be transferred. The record mode represents the file formats and bit rates of music track files ripped to the PC 2. In the example shown in FIG. 8, the transfer music track column indicates that music track files having a file format of MP4 and a bit rate of 128 kbps have been ripped.

Figure 9:
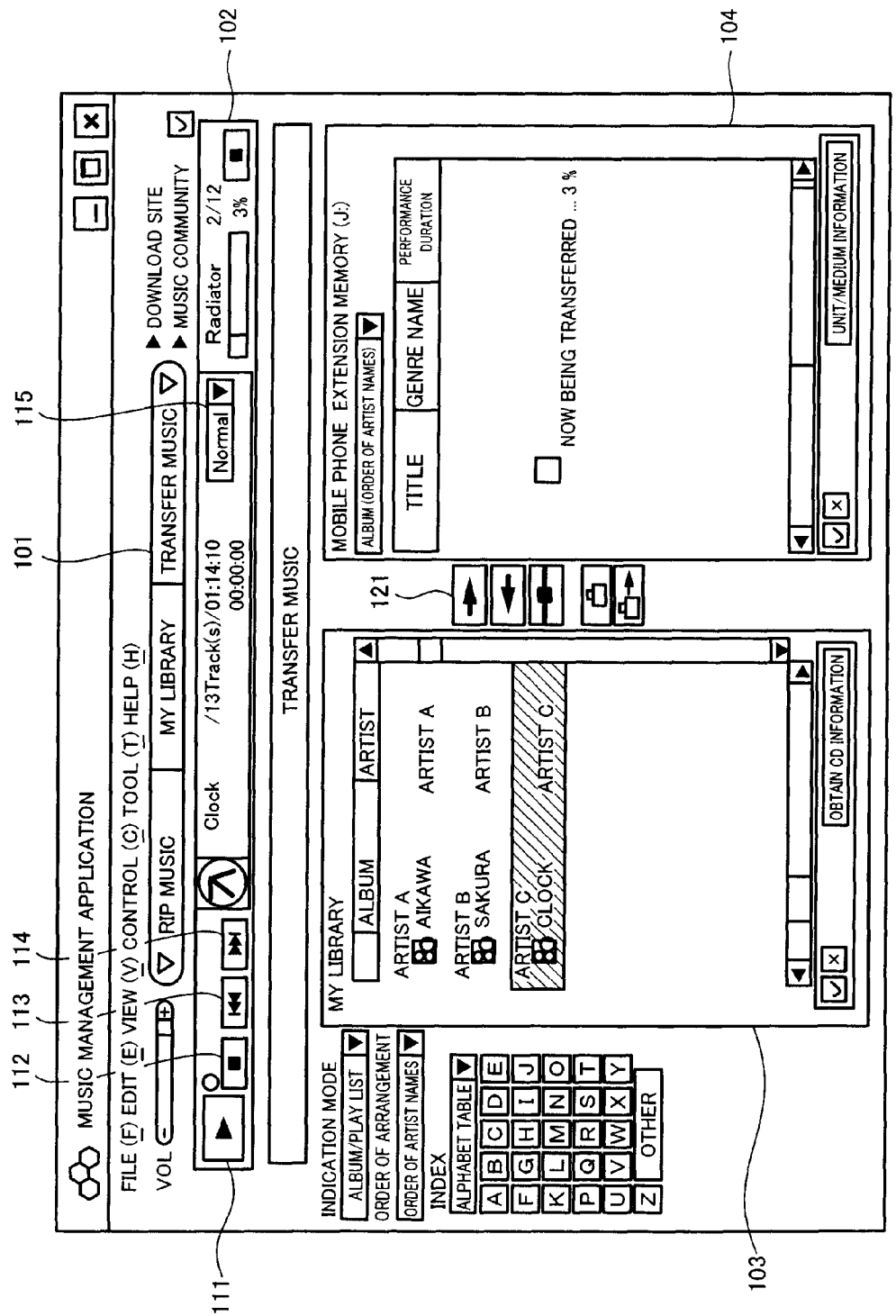
FIG. 9 is a schematic diagram showing another exemplary screen displayed on the display unit.

When a predetermined music track is selected from those indicated in the my library column 103 and a transfer button 121 is pressed in the state that the music track to be transferred has been registered in the transfer music track column 104, the music track file is started to be transferred. While the music track is being transferred, the transfer music track column 104 indicates information denoting that the music track file is being transferred as shown in FIG. 9.

Returning to FIG. 7, at step S11, the application control section 42 is commanded by the UI section 41 to do that. Thereafter, the flow advances to step S12. At step S12, the application control section 42 commands the transfer processing section 50 to obtain the reproducible file format list from the mobile phone 1 as a transfer target PD.

At step S31, the transfer processing section 50 is commanded by the application control section 42 to do that. Thereafter, the flow advances to step S32. At step S32, the transfer processing section 50 commands the PD plug-in 51-1, which is a dedicated plug-in that communicates with the mobile phone 1, to obtains the reproducible file format list.

At step S41, the PD plug-in 51-1 is commanded by the transfer processing section 50 to do that. Thereafter, the flow advances to step S42. At step S42, the PD plug-in 51-1 requests the mobile phone interface 61 of the mobile phone 1 to transmit the reproducible file format list.

At step S51, the mobile phone interface 61 of the mobile phone 1 is requested by the PD plug-in 51-1 to do that. Thereafter, the flow advances to step S52. At step S52, the mobile phone interface 61 accesses the reproducible file format list storage section 63 and obtains the reproducible file format list.

At step S61, the reproducible file format list storage section 63 is accessed by the mobile phone interface 61 and outputs the stored reproducible file format list to the mobile phone interface 61. The reproducible file format list obtained by the mobile phone interface 61 is transmitted to the PD plug-in 51-1 of the PC 2 and then supplied to the application control section 42 through the transfer processing section 50.

When the application control section 42 has obtained the reproducible file format list, the flow advances to step S13. At step S13, the application control section 42 requests the music track management section 43 to find a music track file that has been commanded to be transferred by the user and that has the same file format as that registered in the reproducible file format list obtained from the mobile phone 1 from those that have been ripped.

At step S21, the music track management section 43 is requested by the application control section 42 to find a music track file that has been commanded to be transferred and that has the same file format as that registered in the reproducible file format list obtained from the mobile phone 1. The music track file is retrieved by referencing the music track DB 44 that records the information shown in FIG. 6.

For example, the music track ID of the music track commanded to be transferred and information representing the file format registered in the reproducible file format list obtained from the mobile phone 1 are supplied from the application control section 42 to the music track management section 43. The music track management section 43 retrieves a music track file having the same file format as that registered in the reproducible file format list from those having the same music track ID as that of the music track commanded to be transferred.

When the music management section 43 has found a music track file having the same music track ID as that of the music track commanded to be transferred and having the same file format as that registered in the reproducible file format list, the flow advances to step S22. At step S22, the music track management section 43 informs the application control section 42 that a music track file to be transferred has been found.

At step S14, the application control section 42 is informed by the music track management section 43 about that. Thereafter, the flow advances to step S15. At step S15, the application control section 42 commands the transfer processing section 50 to transfer the music track file found by the music track management section 43 without change to the mobile phone 1. For example, a music track file to be transferred is read from the HDD 21 based on a path or the like contained in the file name and then supplied to the transfer processing section 50 through the application control section 42.

At step S33, the transfer processing section 50 is commanded by the application control section 42 to do that. Thereafter, the flow advances to step S34. At step S34, the transfer processing section 50 outputs the music track file supplied from the application control section 42 to the PD plug-in 51-1 and commands it to transfer the music track file to the mobile phone 1.

At step S43, the PD plug-in 51-1 is commanded by the transfer processing section 50 to do that. Thereafter, the flow advances to step S44. At step S44, the PD plug-in 51-1 transfers the music track file to the mobile phone interface 61 of the mobile phone 1.

At step S53, the mobile phone interface 61 of the mobile phone 1 receives the music track file from the PD plug-in 51-1 and completes the process. The music track file received by the mobile phone interface 61 is stored in a flash memory or the like of the mobile phone 1 and reproduced at a predetermined timing.

Thus, a music track file having a file format reproduced by the mobile phone 1 is selected from those having been ripped to the PC 2 and then transferred to the mobile phone 1.

Next, with reference to a sequence chart shown in FIG. 10, a flow of a sequence of steps of another music track file transfer process will be described.

Figure 10:
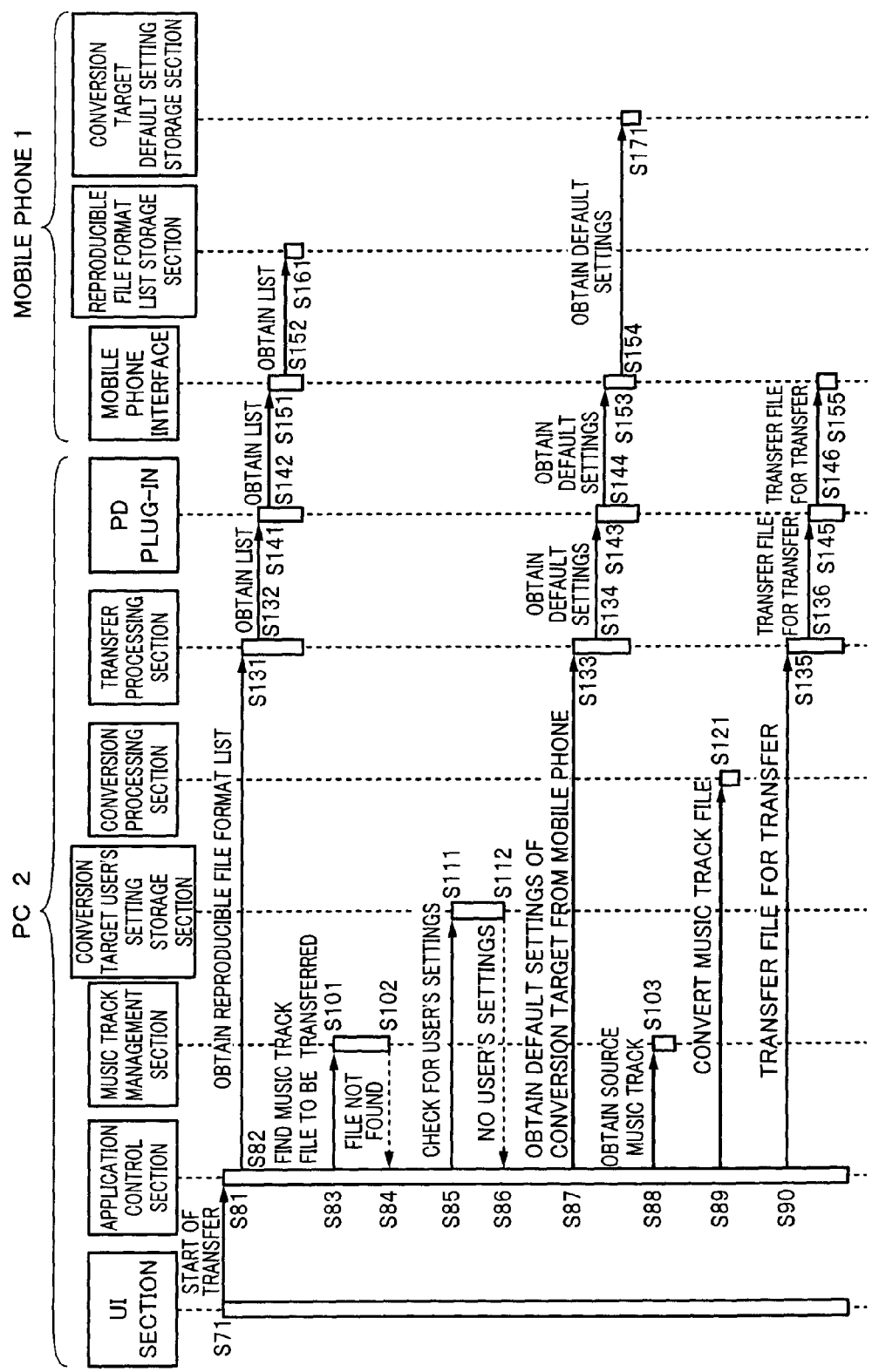
FIG. 10 is a sequence chart describing a flow of a sequence of steps of another music track file transfer process.

FIG. 10 shows the case that since a music track file having the same file format as that registered in the reproducible file format list obtained from the mobile phone 1 is not stored in the PC 2, a music track file is converted and the converted music track file is transferred.

When the user commands the PC 2 to transfer a predetermined music track to the mobile phone 1, the flow advances to step S71. At step S71, the UI section 41 of the PC 2 commands the application control section 42 to start transferring the corresponding music track file.

At step S81, the application control section 42 is commanded by the UI section 41 to do that. Thereafter, the flow advances to step S82. At step S82, the application control section 42 commands the transfer processing section 50 to obtain the reproducible file format list from the mobile phone 1 as a transfer target PD.

At step S131, the transfer processing section 50 is commanded by the application control section 42 to do that. Thereafter, the flow advances to step S132. At step S132, the transfer processing section 50 commands the PD plug-in 51-1, which is a dedicated plug-in that communicates with the mobile phone 1, to obtain the reproducible file format list.

At step S141, the PD plug-in 51-1 is commanded by the transfer processing section 50 to do that. Thereafter, the flow advances to step S142. At step S142, the PD plug-in 51-1 requests the mobile phone interface 61 of the mobile phone 1 to transmit the reproducible file format list.

At step S151, the mobile phone interface 61 of the mobile phone 1 is requested by the PD plug-in 51-1 to do that. Thereafter, the flow advances to step S152. At step S152, the mobile phone interface 61 accesses the reproducible file format list storage section 63 and obtains the reproducible file format list.

At step S161, the reproducible file format list storage section 63 is accessed by the mobile phone interface 61 and outputs the stored reproducible file format list to the mobile phone interface 61. The reproducible file format list obtained by the mobile phone interface 61 is transmitted from the mobile phone interface 61 to the PD plug-in 51-1 of the PC 2 and then supplied to the application control section 42 through the transfer processing section 50.

When the application control section 42 has obtained the reproducible file format list, the flow advances to step S83. At step S83, the application control section 42 requests the music track management section 43 to find a music track file that has been commanded to be transferred by the user and that has the same file format as that registered in the reproducible file format list obtained from the mobile phone 1 from those that have been ripped. Information representing file formats registered in the reproducible file format list obtained from the mobile phone 1 is also supplied to the music track management section 43.

At step S101, the music track management section 43 is requested by the application control section 42 to find a music track file that has been commanded to be transferred and that has the same file format as that registered in the reproducible file format list obtained from the mobile phone 1 with reference to information recorded in the music track DB 44.

When a music track file having the same music track ID as that of the music track commanded to be transferred and having the same file format as that registered in the reproducible file format list has not been found, the flow advances to step S102. At step S102, the music track management section 43 informs the application control section 42 that a music track file to be transferred has not been found.

At step S84, the application control section 42 is informed by the music track management section 43 about that. Thereafter, the flow advances to step S85. At step S85, the application control section 42 requests the conversion target user's setting storage section 46 to determine whether or not the default settings of the file format and bit rate of the conversion target have been changed by the user.

At step S111, the conversion target user's setting storage section 46 is requested by the application control section 42 to do that. When the default settings of the file format and bit rate of the conversion target have not been changed by the user, the conversion target user's setting storage section 46 informs the application control section 42 that the conversion target user's setting storage section 46 has not stored the user's settings as the conversion target.

At step S86, the application control section 42 is informed by the conversion target user's setting storage section 46 about that. Thereafter, the flow advances to step S87. At step S87, the application control section 42 commands the transfer processing section 50 to obtain the default settings of the conversion target from the mobile phone 1.

At step S133, the transfer processing section 50 is commanded by the application control section 42 to do that. Thereafter, the flow advances to step S134. At step S134, the transfer processing section 50 commands the PD plug-in 51-1 to obtain the default settings of the conversion target.

At step S143, the PD plug-in 51-1 is commanded by the transfer processing section 50 to do that. Thereafter, the flow advances to step S144. At step S144, the PD plug-in 51-1 requests the mobile phone interface 61 of the mobile phone 1 to transmit the default settings of the conversion target.

At step S153, the mobile phone interface 61 of the mobile phone 1 is requested by the PD plug-in 51-1 to do that. Thereafter, the flow advances to step S154. At step S154, the mobile phone interface 61 accesses the conversion target default setting storage section 62 and obtains the default settings of the conversion target.

At step S171, the conversion target default setting storage section 62 is accessed by the mobile phone interface 61 and outputs the stored default settings of the conversion target to the mobile phone interface 61. The default settings of the conversion target obtained by the mobile phone interface 61 are transmitted to the PD plug-in 51-1 of the PC 2 and then supplied to the application control section 42 through the transfer processing section 50.

When the application control section 42 has obtained the default settings of the conversion target, the flow advances to step S88. At step S88, the application control section 42 requests the music track management section 43 to obtain the music track file that has been commanded to be transferred by the user.

At step S103, the music track management section 43 is requested by the application control section 42 to do that and obtains a music track file that has been commanded to be transferred by the user from the HDD 21. In this case, a music track file having a predetermined file format and a predetermined bit rate is obtained from the HDD 21. The obtained music track file is supplied to the application control section 42.

At step S89, the application control section 42 outputs the music track file supplied from the music track management section 43 to the conversion processing section 47 and commands the conversion processing section 47 to convert the music track file. At this point, information representing the file format and the bit rate of the default settings of the conversion target obtained from the mobile phone 1 is also supplied to the conversion processing section 47.

At step S121, the conversion processing section 47 receives the music track file and the information representing the file format and bit rate from the application control section 42. The conversion processing section 47 outputs the received music track file to the PC plug-in, which converts a music track file having the same file format as that of the received music track file as a conversion source, and commands the PC plug-in to convert the music track file into a music track file having the file format and bit rate of the default settings of the conversion target. For example, the PC plug-in 48-1 converts the music track file and generates the file for transfer 49.

At step S90, the application control section 42 supplies the file for transfer 49 to the transfer processing section 50 and commands it to transfer the file for transfer 49.

At step S135, the transfer processing section 50 is commanded by the application control section 42 to do that. Thereafter, the flow advances to step S136. At step S136, the transfer processing section 50 commands the PD plug-in 51-1 to transfer the file for transfer 49.

At step S145, the PD plug-in 51-1 is commanded by the transfer processing section 50 to do that. Thereafter, the flow advances to step S146. At step S146, the PD plug-in 51-1 transfers the file for transfer 49 to the mobile phone interface 61 of the mobile phone 1.

At step S155, the mobile phone interface 61 of the mobile phone 1 receives the file for transfer 49 from the PD plug-in 51-1 and completes the process. The music track file received by the mobile phone interface 61 is stored in a flash memory or the like of the mobile phone 1 and reproduced at a predetermined timing.

Thus, the music track file having the file format and bit rate of the default settings of the mobile phone 1 is transferred from the PC 2 to the mobile phone 1.

Figure 11:
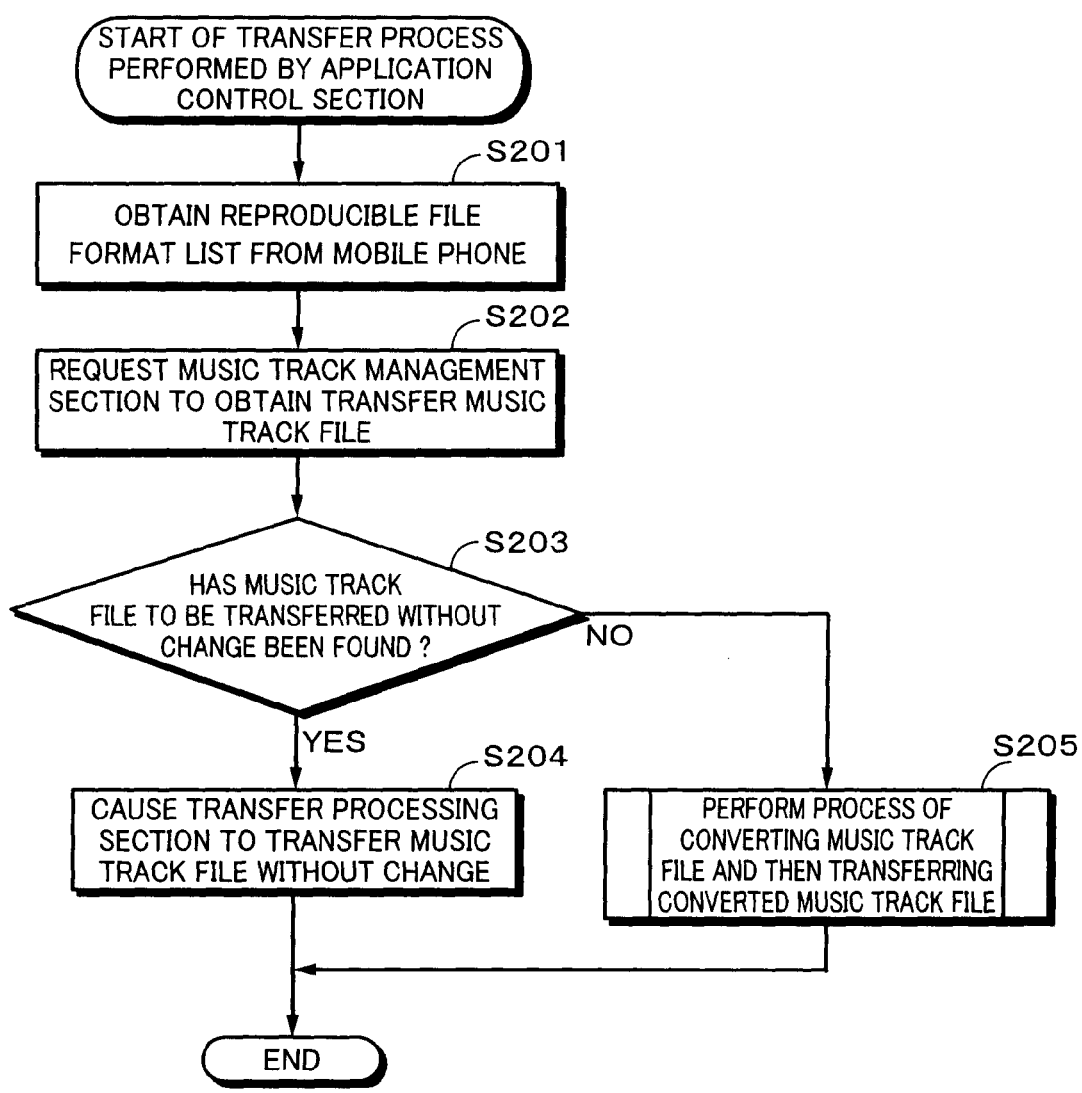
FIG. 11 is a flow chart describing a main process of an application control section.

Next, with reference to a flow chart shown in FIG. 11, the music track file transfer process performed by the PC 2 will be described. The process is performed by the PC 2 on the basis of the flow charts described with reference to FIG. 7 and FIG. 10.

First, with reference to the flow chart shown in FIG. 11, a main process of the application control section 42 in the music track file transfer process will be described.

This process is started when the user commands the PC 2 to transfer a music track and then the UI section 41 commands the application control section 42 to start transferring the corresponding music track file.

At step S201, the application control section 42 commands the transfer processing section 50 to obtain the reproducible file format list from the mobile phone 1 as a transfer target PD. As described above, the PD plug-in 51-1 obtains the reproducible file format list under the control of the transfer processing section 50. The obtained reproducible file format list is supplied to the application control section 42 through the transfer processing section 50.

At step S202, the application control section 42 requests the music track management section 43 to obtain the music track file that has been commanded to be transferred by the user. Information representing the file format registered in the reproducible file format list obtained from the mobile phone 1 is also supplied to the music track management section 43. The music track management section 43 is requested by the application control section 42 to retrieve the music track file that has been commanded to be transferred by the user and that has the same file format as that registered in the reproducible file format list obtained from the mobile phone 1 and informs the application control section 42 about the searched result.

At step S203, the application control section 42 determines whether or not it has been informed that a music track file that has been commanded to be transferred, that has the same file format as that registered in the reproducible file format list, that had been ripped to the PC 2, and that can be transferred without change has been found.

When the application control section 42 has been informed that the music track file had been found at step S203, the flow advances to step S204. At step S204, the application control section 42 obtains the music track file from the music track management section 43 and causes the transfer processing section 50 to transfer the obtained music track file without change to the mobile phone 1. Thereafter, the application control section 42 completes the process.

In contrast, at step S203, when the application control section 42 has been informed that since there is no music track file having the same file format as that registered in the reproducible file format list, a music track file that can be transferred without change has not been found, the flow advances to step S205.

At step S205, the application control section 42 performs a process of converting a music track file having a particular file format into a music track file having another file format and then transferring the converted music track file. Thereafter, the application control section 42 completes the process. The process performed at step S205 will be described later in detail with reference to a flow chart shown in FIG. 13.

Figure 12:
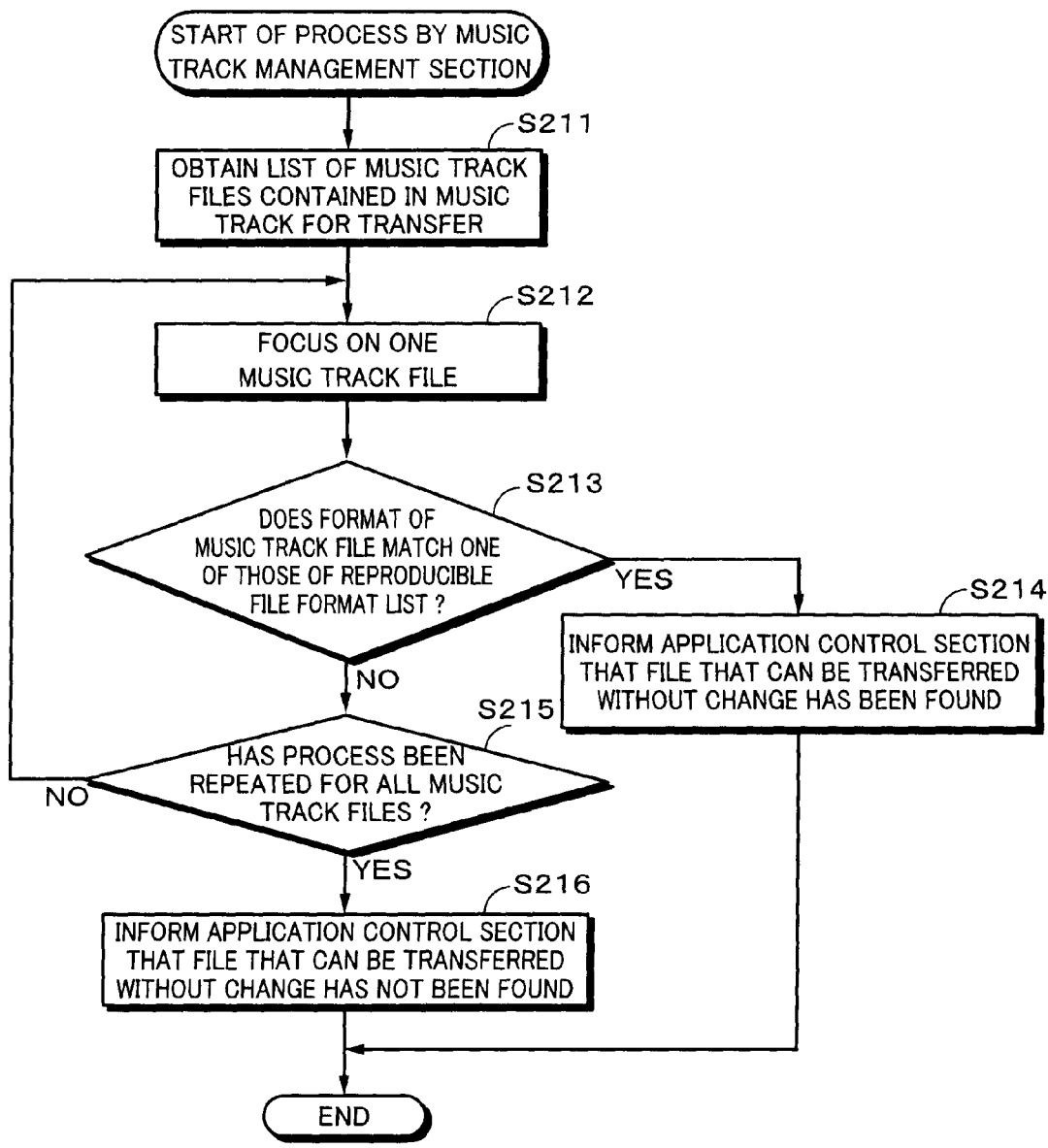
FIG. 12 is a flow chart describing a music track management section.

Next, with reference to the flow chart shown in FIG. 12, the process performed by the music track management section 43 requested by the application control section 42 at step S202 shown in FIG. 11 will be described.

At step S211, the music track management section 43 obtains a list of music track files to be transferred from the music track DB 44. When the music track management section 43 has been informed by the application control section 42 about a music track ID of a music track to be transferred, a list of music track files having the same music track ID recorded as an attribute is obtained.

At step S212, the music track management section 43 focuses on one music track file registered in the list. Thereafter, the flow advances to step S213. At step S213, the music track management section 43 determines whether or not the reproducible file format list supplied from the application control section 42 contains a file format that matches that of the music track file on which the music track management section 43 is focusing.

When the determined result at step S213 denotes that the reproducible file format list contains a file format that matches that of the music track file on which the music track management section 43 is focusing, the flow advances to step S214.

At step S214, the music track management section 43 informs the application control section 42 that a music track file that can be transferred without change has been found and completes the process. The music track file on which the music track management section 43 is focusing is supplied as a music track file that can be transferred without change to the application control section 42. The application control section 42 causes the transfer processing section 50 to transfer the music track file to the mobile phone 1 (at step S204 shown in FIG. 11).

In contrast, when the determined result at step S213 denotes that the reproducible file format list does not contain a file format that matches that of the music track file on which the music track management section 43 is focusing, the flow advances to step S215.

At step S215, the music track management section 43 determines whether or not it has repeated the process until it has focused on all the music track files in the list obtained at step S211.

When the determined result at step S215 denotes that the music track management section 43 has not repeated the process until it has focused on all the music track files, the flow returns to step S212. At step S212, the music track management section 43 repeats the same process. In other words, the music track management section 43 focuses on the next music track file in the list obtained at step S211 and repeats the foregoing process.

In contrast, when the determined result at step S215 denotes that the music track management section 43 has repeated the process until it has focused on all the music track files in the list, the flow advances to step S216. At step S216, the music track management section 43 informs the application control section 42 that a music track file that can be transferred without change has not been found and completes the process. The application control section 42 performs the process of converting the music track file and then transferring the converted music track file (at step S205 shown in FIG. 11).

Next, with reference to a flow chart shown in FIG. 13, the process of converting the music track file and then transferring the converted music track file, performed by the application control section 42, at step S205 shown in FIG. 11, will be described.

At step S221, the application control section 42 determines whether or not the conversion target user's setting storage section 46 stores the user's settings of the conversion target because the default settings of the conversion target have been changed by the user.

When the determines result at step S221 denotes that the conversion target user's setting storage section 46 stores the user's settings of the conversion target, the flow advances to step S22. At step S222, the application control section 42 uses the file format and bit rate of the user's settings of the conversion target stored in the conversion target user's setting storage section 46 as the file format and bit rate of the conversion target.

In contrast, when the determined result at step S221 denotes that the conversion target user's setting storage section 46 does not store the user's settings of the conversion target, the flow advances to step S223. At step S223, the application control section 42 commands the transfer processing section 50 to obtain the default settings of the conversion target from the mobile phone 1 as a transfer target PD.

At this point, the PD plug-in 51-1 obtains the default settings of the conversion target from the mobile phone 1 under the control of the transfer processing section 50 and supplies the obtained default settings of the conversion target to the application control section 42 through the transfer processing section 50. The application control section 42 obtains the default settings of the conversion target and uses the file format and bit rate of the default settings of the conversion target as the file format and bit rate of the conversion target.

At step S224, the application control section 42 inquires of the music track management section 43 a music track file to be transferred and obtains it.

At step S225, the application control section 42 outputs the obtained music track file to the conversion processing section 47 and causes it to convert the file format and bit rate of the music track file. In this case, the music track file having the file format and bit rate of the user's settings of the conversion target used at step S222 or the music track file having the file format and bit rate of the default settings of the conversion target used at step S223 is created as the file for transfer 49.

At step S226, the application control section 42 causes the transfer processing section 50 to transfer the file for transfer 49 created at step S225 to the mobile phone 1 and completes the process.

Next, with reference to a flow chart shown in FIG. 14, a process of setting the file format and bit rate of a conversion target, performed by the application control section 42, will be described.

This process is started when the user performs a predetermined operation while a screen shown in FIG. 8 is displayed.

Figure 13:
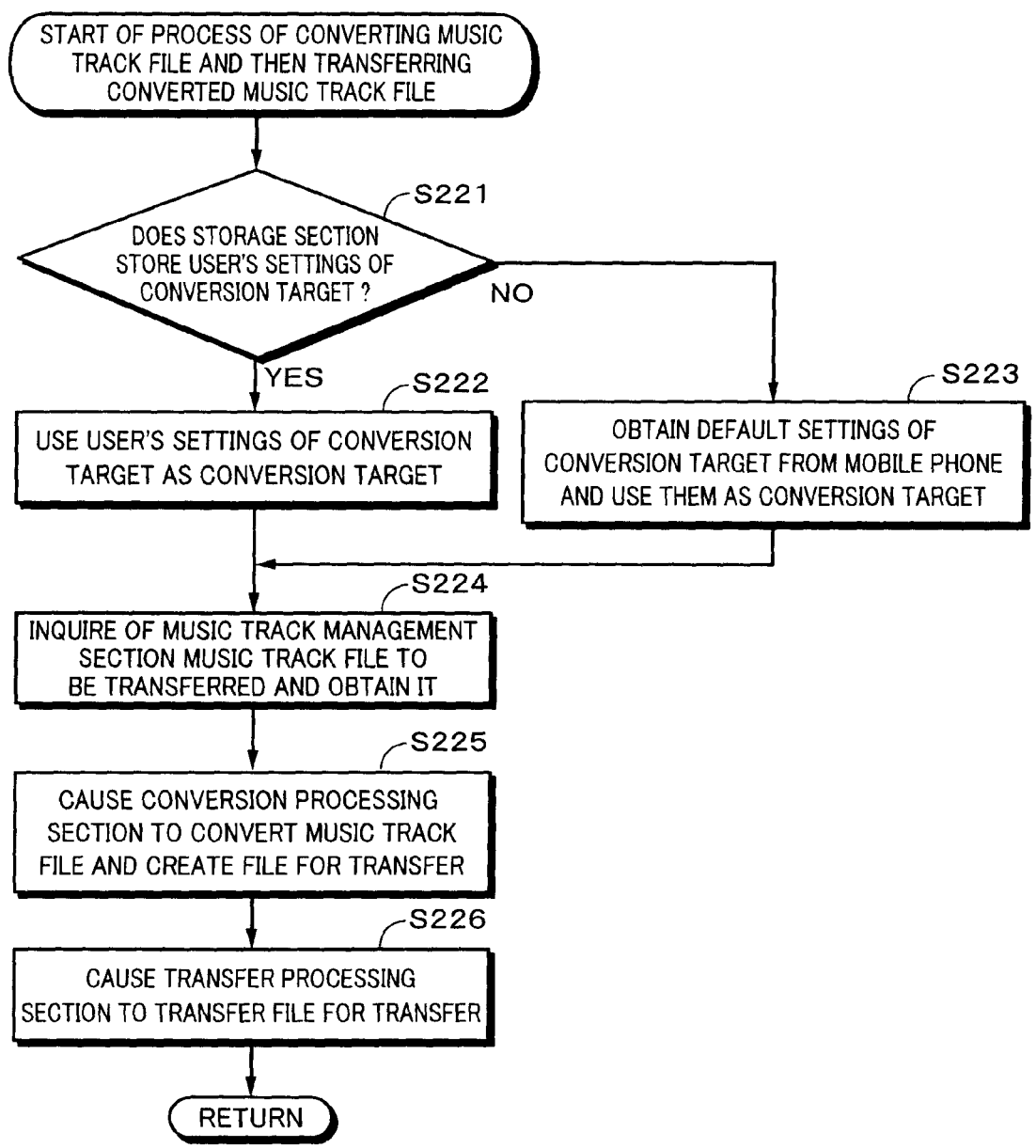
FIG. 13 is a flow chart describing a process of the application control section.
Figure 14:
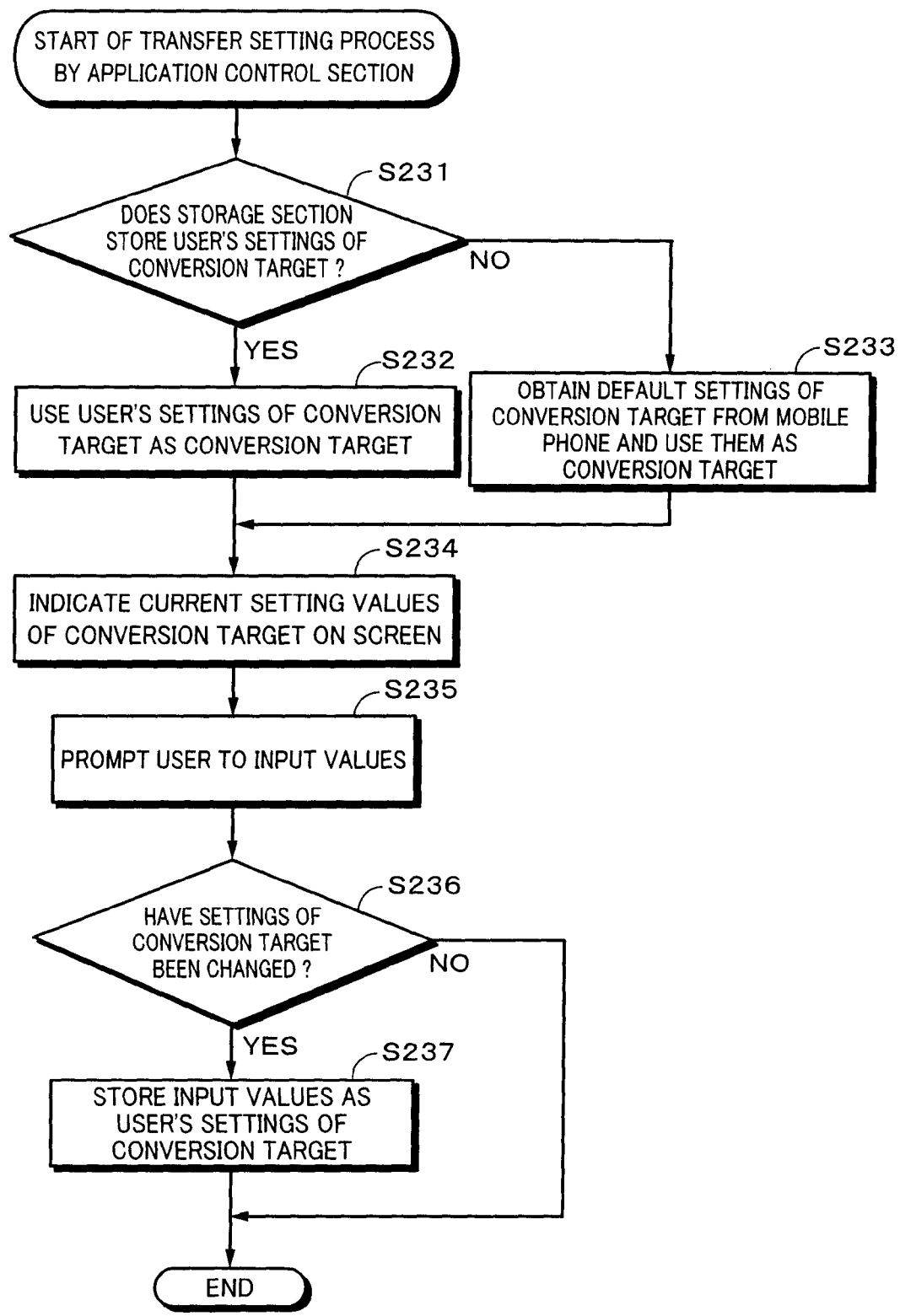
FIG. 14 is a flow chart describing another process of the application control section.

The process from step S231 to step S233 shown in FIG. 14 is the same as the process from step S221 to step S223 shown in FIG. 13. In other words, at step S231, the application control section 42 determines whether or not the conversion target user's setting storage section 46 stores the user's settings of the conversion target.

When the determined result at step S231 denotes that the conversion target user's setting storage section 46 stores the user's settings of the conversion target, the flow advances to step S232. At step S232, the application control section 42 uses the file format and bit rate of the user's settings of the conversion target stored in the conversion target user's setting storage section 46 as the file format and bit rate of the conversion target.

In contrast, when the determined result at step S231 denotes that the conversion target user's setting storage section 46 does not store the user's settings of the conversion target, the flow advances to step S233. At step S233, the application control section 42 commands the transfer processing section 50 to obtain the default settings of the conversion target from the mobile phone 1. The application control section 42 obtains the default settings of the conversion target obtained from the mobile phone 1 and supplied from the transfer processing section 50 and uses the file format and bit rate of the default settings of the conversion target as the file format and bit rate of the conversion target.

At step S234, the application control section 42 controls the UI section 41 to indicate the current setting values of the file format and bit rate of the conversion target on the screen. In other words, the file format and bit rate of the user's settings of the conversion target used at step S232 or the file format and bit rate of the default settings of the conversion target used at step S232 are indicated on the screen.

Figure 15:
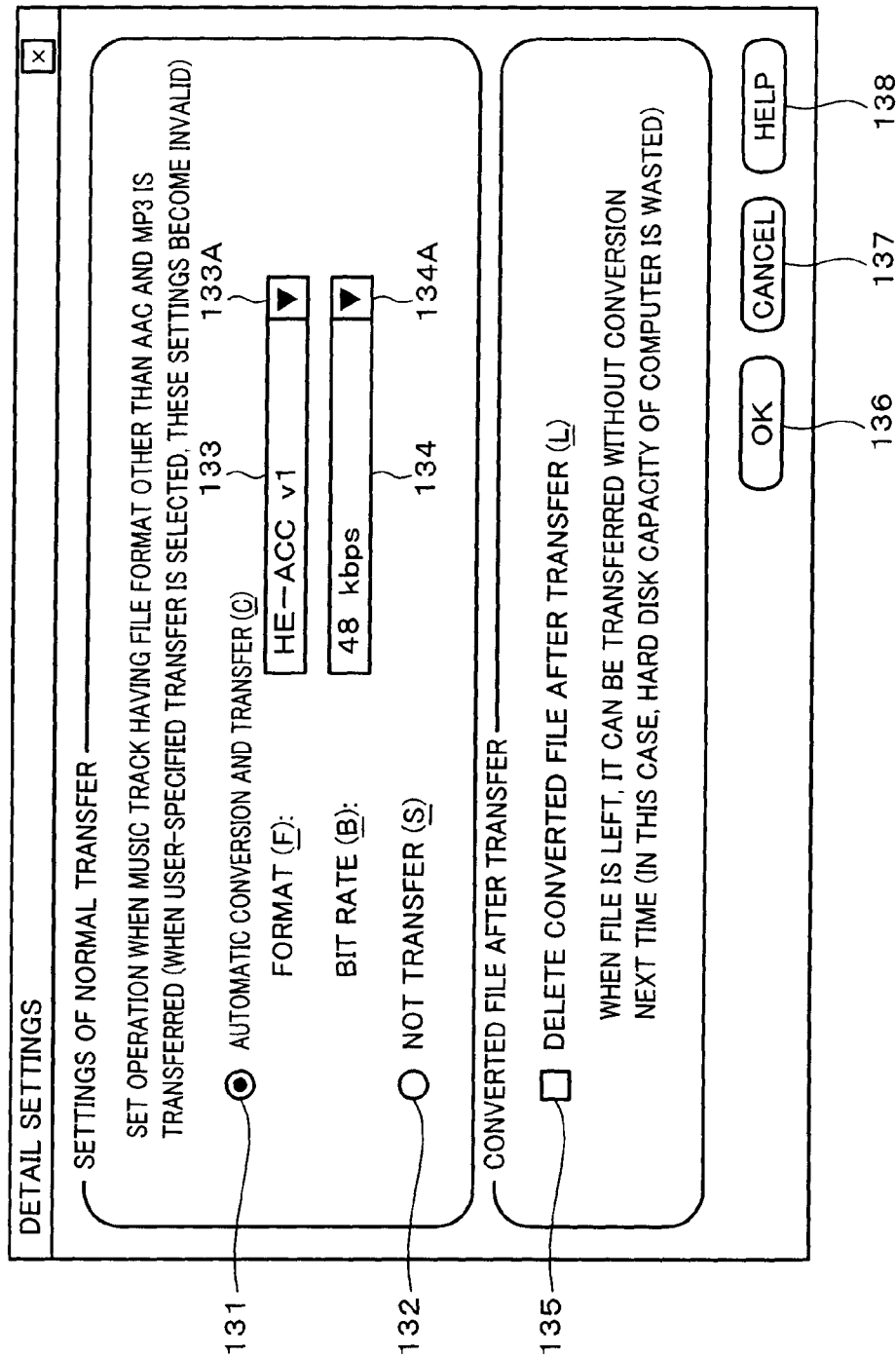
FIG. 15 is a schematic diagram showing an exemplary setting screen.

FIG. 15 is a schematic diagram showing an exemplary setting screen for a file format and a bit rate (this screen is a window superimposed in part with the screen shown in FIG. 8).

In the exemplary setting screen shown in FIG. 15, the user can set an operation in the process performed when he or she has selected as a music track file having a file format other than AAC and MP3 as a transfer target and a treatment of a converted file after it is transferred.

When the user checks a check column 131 and selects a music track file having a file format other than AAC and MP3 as a transfer target, the application control section 42 is set such that the file format is automatically converted and the converted music track file is automatically transferred. When the user checks a check column 132 and selects a music track file having a file format other than AAC and MP3 as a transfer target, the application control section 42 is set such that the music track file is not transferred.

A file format indication column 133 is a column that indicates a file format of a conversion target when the file is automatically converted and transferred. In the example shown in FIG. 15, the file format indication column 133 indicates a file format of "HE-AAC vl". The file format "HE-AAC vl" is indicated as the current setting value of the file format of the conversion target at step S234 of the process shown in FIG. 14.

When the user presses a pull-down button 133A on the right end of the file format indication column 133, the file format indication column 133 indicates a list of file formats. When the user selects a predetermined file format from the list, the file format currently indicated in the file format indication column 133 can be changed to the selected file format.

A bit rate indication column 134 is a column that indicates a bit rate of a music track file of a conversion target that is automatically converted and transferred. In the example shown in FIG. 15, the bit rate indication column 134 indicates a bit rate of "48 kbps". The bit rate "48 kbps" is indicated as the current setting value of the music track file of the conversion target at step S234 of the process shown in FIG. 14.

When the user presses a pull-down button 134A on the right end of the bit rate indication column 134, it indicates a list of bit rates. When the user selects a predetermined bit rate from the list, the bit rate currently indicated in the bit rate indication column 134 can be changed to the selected bit rate.

FIG. 16 is a schematic diagram showing an exemplary screen displayed when the pull-down button 134A is pressed while the screen shown in FIG. 15 is displayed.

In the example shown in FIG. 16, a list 134B is displayed below the bit rate indication column 134 such that a plurality of bit rates are presented to the user. When the user selects a predetermined bit rate from those indicated in the list 134B, the current bit rate can be changed to the selected bit rate.

When a check column 135 shown in FIG. 15 is checked, the application control section 42 is set such that a converted file is deleted after it is transferred. An OK button 136 is a button that is used to confirm the settings on the screen shown in FIG. 15 and complete the settings. A cancel button 137 is a button used to cancel settings and complete the settings. A help button 138 is a button used to display explanation of the function of the screen.

Returning to FIG. 14, at step S235, the application control section 42 prompts the user to input setting values. Thereafter, the flow advances to step S236. At step S236, the application control section 42 determines whether or not the setting of the file format and bit rate of the conversion target have been changed. The user's operation is accepted by the UI section 41. Information that represents the accepted operation is supplied to the application control section 42.

When the determined result at step S236 denotes that the settings of the file format and bit rate of the conversion target have been changed, the flow advances to step S237. At step S237, the application control section 42 causes the conversion target user's setting storage section 46 to store the information representing the changed file format and bit rate as changed user's settings of the conversion target and completes the process.

At step S236, when the cancel button 137 shown in FIG. 15 has been pressed, the application control section 42 determines that the settings of the file format and bit rate of the conversion target have not been changed. In this case, the application control section 42 skips step S237 and completes the process.

In the foregoing process, the setting of the file format and bit rate of the conversion target are changed.

The settings of the file format and bit rate that have been changed in such a manner may be transferred to the mobile phone 1 and overwritten to the default settings of the conversion target. Thus, when the user connects the mobile phone 1 that stores the settings of the changed file format and bit rate to the PC 2, a music track file having changed file format and bit rate can be transferred from the PC 2 to the mobile phone 1 regardless of whether or not the settings of the file format and bit rate of the conversion target have been changed in the PC 2 as long as the similar music management application has been installed thereinto.

In the foregoing, information representing the default settings of the conversion target, managed by the PD, and information representing the user's settings of the conversion target, managed by the music management application, are the file format and bit rate of the conversion target. Instead, information representing the default settings of the conversion target and information representing the user's settings of the conversion target may be various types of information. These information may include for example the number of channels, VBR (Variable Bit Rate)/CBR (Constant Bit Rate), the number of quantizer bits, presence or absence of jacket photo, picture size, and data format.

In the foregoing, it was assumed that the PD as a transfer target of a music track file was a mobile phone. However, when a music track file is processed in the foregoing manner, the processed music track file may be transferred to a music reproduction-only terminal, a PDA (Personal Digital Assistants), a portable game machine, and so forth.

In the foregoing, it was assumed that content to be transferred was a music track file. However, when content to be transferred is processed in the foregoing manner, various types of contents such as a moving picture file and a still picture file may be transferred.

The foregoing sequence of processes may be executed by hardware and/or software. When the sequence of processes is executed by software, programs that compose the software are installed from a program record medium into a computer disposed in dedicated hardware or a general purpose personal computer that can execute various types of functions based on various types of programs that have been installed thereinto.

As shown in FIG. 4, the program record medium, which stores programs installed into the computer and executed thereby, is for example a package medium, such as a magnetic disc (including a flexible disc) 31, an optical disc (including a CD-ROM (Compact Disc-Read Only Memory)), a DVD (Digital Versatile Disc) 32, a magneto-optical disc 33, or a semiconductor memory 34). Instead, the program record medium may be a ROM 12 or a HDD 21, which temporarily or permanently stores programs. When necessary, programs are stored to the program record medium through the communication section 25 such as a router or a modem using a cable or wireless communication medium such as a local area network, Internet, or a digital satellite broadcast.

In this specification, steps describing a program are executed chronologically in the described order. Instead, they may be executed non-chronologically, in parallel, or discretely.

In this specification, the system represents the entirety of a plurality of units that compose the system.

It should be understood by those skilled in the art that various modifications, combinations, sub-combinations and alternations may occur depending on design requirements and other factors insofar as they are within the scope of the appended claims or the equivalents thereof.

What is claimed is:

1. A content transfer system including a reproduction terminal which reproduces content and an information processing apparatus, wherein the reproduction terminal comprises:
means for storing a list of file formats of content reproducible by the reproduction terminal and information representing a bit rate of content reproducible by the reproduction terminal; and
means for transmitting the list and the information stored in the means for storing to the information processing apparatus, and
wherein the information processing apparatus comprises:
means for storing content having a predetermined file format and a predetermined bit rate;
means for obtaining, from the reproduction terminal, the list of file formats of content reproducible by the reproduction terminal and the information representing the bit rate of the content reproducible by the reproduction terminal;
means for determining whether the predetermined file format and the predetermined bit rate of the content stored by the means for storing match one of the file formats included in the list and the bit rate represented by the information received by the means for obtaining;
means for converting the content having the predetermined file format and the predetermined bit rate as a transfer target into content having one of the file formats included in the list and the bit rate represented by the information received by the means for obtaining, when the means for determining determines that the predetermined file format and the predetermined bit rate of the stored content do not match one of the file formats included in the list and the bit rate represented by the information; and
means for transferring the stored content to the reproduction terminal without conversion when the means for determining determines that the predetermined file format and the predetermined bit rate of the stored content match one of the file formats included in the list and the bit rate represented by the information, and for transferring the content converted by the means for converting to the reproduction terminal, when the means for determining determines that the predetermined file format and the predetermined bit rate of the stored content do not match one of the file formats included in the list and the bit rate represented by the information.

2. An information processing apparatus which transfers content to a reproduction terminal, the information processing apparatus comprises:
a storage unit that stores the content having a predetermined file format and a predetermined bit rate;
an interface configured to receive, from the reproduction terminal, a list of file formats of content reproducible by the reproduction terminal and information representing a bit rate of the content reproducible by the reproduction terminal;
a processor configured to determine whether the predetermined file format and the predetermined bit rate of the stored content match one of the file formats included in the list and the bit rate represented by the information received by the interface;
the processor further configured to convert the content having the predetermined file format and the predetermined bit rate as a transfer target into content having one of the file formats included in the list and the bit rate represented by the information received by the interface, when it is determined that the predetermined file format and the predetermined bit rate of the stored content do not match one of the file formats included in the list and the bit rate represented by the information; and
the interface is further configured to transfer the stored content to the reproduction terminal without conversion when it is determined that the predetermined file format and the predetermined bit rate of the stored content match one of the file formats included in the list and the bit rate represented by the information, and to transfer the content converted by the processor to the reproduction terminal, when it is determined that the predetermined file format and the predetermined bit rate of the stored content do not match one of the file formats included in the list and the bit rate represented by the information.

3. The information processing apparatus as set forth in claim 2, further comprising:
a memory configured to store information representing a file format and a bit rate of content as a conversion target, the information being set by a user,
wherein the processor is configured to convert the content as the transfer target such that the file format and the bit rate represented by the information received by the interface are changed to the file format and the bit rate represented by the information stored in the memory.

4. The information processing apparatus as set forth in claim 2,
wherein when the file format of the content as the transfer target has not been registered in the list received by the interface, the processor converts the content as the transfer target such that the content as the transfer target has the file format and the bit rate represented by the information received by the interface.

5. The information processing apparatus as set forth in claim 2,
wherein the list of file formats of content reproducible by the reproduction terminal and the information representing the bit rate of the content reproducible by the reproduction terminal has been stored in the reproduction terminal upon sales thereof.

6. A method of transferring content to a reproduction terminal, comprising:
storing the content having a predetermined file format and a predetermined bit rate;
receiving, from the reproduction terminal, a list of file formats of content reproducible by the reproduction terminal and information representing a bit rate of the content reproducible by the reproduction terminal therefrom;
determining whether the predetermined file format and the predetermined bit rate of the stored content match one of the file formats included in the list and the bit rate represented by the information received from the reproduction terminal;
converting the content having the predetermined file format and the predetermined bit rate as a transfer target into content having one of the file formats included in the list and the bit rate represented by the received information, when it is determined that the predetermined file format and the predetermined bit rate of the stored content do not match one of the file formats included in the list and the bit rate represented by the information;

transferring the stored content to the reproduction terminal without conversion when it is determined that the predetermined file format and the predetermined bit rate of the stored content match one of the file formats included in the list and the bit rate represented by the information; and transferring the converted content to the reproduction terminal, when it is determined that the predetermined file format and the predetermined bit rate of the stored content do not match one of the file formats included in the list and the bit rate represented by the information.

7. A non-transitory computer-readable medium including a program which causes a computer to perform a process of transferring content to a reproduction terminal, the process comprising:

storing the content having a predetermined file format and a predetermined bit rate;

receiving, from the reproduction terminal, a list of file formats of content reproducible by the reproduction terminal and information representing a bit rate of the content reproducible by the reproduction terminal therefrom;

determining whether the predetermined file format and the predetermined bit rate of the stored content match one of the file formats included in the list and the bit rate represented by the information received from the reproduction terminal;

converting the content having the predetermined file format and the predetermined bit rate as a transfer target into content having one of the file formats included in the list and the bit rate represented by the received information, when it is determined that the predetermined file format and the predetermined bit rate of the stored content do not match one of the file formats included in the list and the bit rate represented by the information;

transferring the stored content to the reproduction terminal without conversion when it is determined that the predetermined file format and the predetermined bit rate of the stored content match one of the file formats included in the list and the bit rate represented by the information; and transferring the converted content to the reproduction terminal, when it is determined that the predetermined file format and the predetermined bit rate of the stored content do not match one of the file formats included in the list and the bit rate represented by the information.

8. A content transfer system including a reproduction terminal which reproduces content and an information processing apparatus, wherein the reproduction terminal comprises:
a memory configured to store a list of file formats of content reproducible by the reproduction terminal and information representing a bit rate of content reproducible by the reproduction terminal; and
an interface configured to transmit the list and the information stored in the memory to the information processing apparatus, and wherein the information processing apparatus comprises:
a storage unit that stores the content having a predetermined file format and a predetermined bit rate;
an interface configured to receive, from the reproduction terminal, a list of file formats of content reproducible by the reproduction terminal and the information representing the bit rate of the content reproducible by the reproduction terminal;
a processor configured to determine whether the predetermined file format and the predetermined bit rate of the stored content match one of the file formats included in the list and the bit rate represented by the information received by the interface;
the processor further configured to convert the content having the predetermined file format and the predetermined bit rate as a transfer target into content having one of the file formats included in the list and the bit rate represented by the information received by the interface, when it is determined that the predetermined file format and the predetermined bit rate of the stored content do not match one of the file formats included in the list and the bit rate represented by the information; and
the interface is further configured to transfer the stored content to the reproduction terminal without conversion when it is determined that the predetermined file format and the predetermined bit rate of the stored content match one of the file formats included in the list and the bit rate represented by the information, and to transfer the content converted by the processor to the reproduction terminal, when it is determined that the predetermined file format and the predetermined bit rate of the stored content do not match one of the file formats included in the list and the bit rate represented by the information.

9. An information processing apparatus which transfers content to a reproduction terminal, the information processing apparatus comprises:

means for storing content having a predetermined file format and a predetermined bit rate;

means for obtaining, from the reproduction terminal, a list of file formats of content reproducible by the reproduction terminal and information representing a bit rate of the content reproducible by the reproduction terminal;

means for determining whether the predetermined file format and the predetermined bit rate of the stored content match one of the file formats included in the list and the bit rate represented by the information received by the means for obtaining;

means for converting content having the predetermined file format and the predetermined bit rate as a transfer target into content having one of the file formats included in the list and the bit rate represented by the information obtained by the means for obtaining, when the means for determining determines that the predetermined file format and the predetermined bit rate of the stored content do not match one of the file formats included in the list and the bit rate represented by the information; and means for transferring the stored content to the reproduction terminal without conversion when the means for determining determines that the predetermined file format and the predetermined bit rate of the stored content match one of the file formats included in the list and the bit rate represented by the information, and for transferring the content converted by the means for converting to the reproduction terminal, when the means for determining determines that the predetermined file format and the predetermined bit rate of the stored content do not match one of the file formats included in the list and the bit rate represented by the information.

* * * * *